United States Patent
Liu et al.

(10) Patent No.: US 8,411,932 B2
(45) Date of Patent: Apr. 2, 2013

(54) EXAMPLE-BASED TWO-DIMENSIONAL TO THREE-DIMENSIONAL IMAGE CONVERSION METHOD, COMPUTER READABLE MEDIUM THEREFOR, AND SYSTEM

(75) Inventors: Kai-Che Liu, Kaohsiung (TW); Fu-Chiang Jan, Jhuolan Township, Miaoli County (TW); Wen-Chao Chen, Kaohsiung (TW); Cheng-Feng Wu, Puzih (TW); Tsu-Han Chen, Wexford, PA (US); Qi Wu, Pittsburgh, PA (US)

(73) Assignee: Industrial Technology Research Institute, Hsinchu (TW)

( * ) Notice: Subject to any disclaimer, the term of this patent is extended or adjusted under 35 U.S.C. 154(b) by 1120 days.

(21) Appl. No.: 12/351,187

(22) Filed: Jan. 9, 2009

(65) Prior Publication Data
US 2010/0014781 A1    Jan. 21, 2010

(30) Foreign Application Priority Data
Jul. 18, 2008    (TW) ............................... 97127534 A

(51) Int. Cl.
*G06K 9/00*    (2006.01)
*G06K 9/32*    (2006.01)
*G06K 9/34*    (2006.01)
*G06T 15/40*    (2011.01)
(52) U.S. Cl. ......... 382/154; 382/294; 382/174; 345/422
(58) Field of Classification Search .............. 382/154, 382/294, 174; 345/422
See application file for complete search history.

(56) References Cited

U.S. PATENT DOCUMENTS

| | | | |
|---|---|---|---|
| 5,530,774 A | 6/1996 | Fogel | |
| 5,856,829 A * | 1/1999 | Gray et al. | 345/422 |
| 6,222,583 B1 * | 4/2001 | Matsumura et al. | 348/113 |
| 6,546,115 B1 * | 4/2003 | Ito et al. | 382/100 |
| 6,891,966 B2 * | 5/2005 | Chen | 382/145 |
| 7,054,478 B2 | 5/2006 | Harman | |
| 7,199,793 B2 * | 4/2007 | Oh et al. | 345/419 |
| 7,583,275 B2 * | 9/2009 | Neumann et al. | 345/633 |
| 2002/0041698 A1 * | 4/2002 | Ito et al. | 382/103 |

(Continued)

FOREIGN PATENT DOCUMENTS
WO    WO 2008062351 A1 *    5/2008

OTHER PUBLICATIONS

"Recovering Surface Layout from an Image," D. Hoiem, et al IJCV, vol. 75, No. 1, Oct. 2007, 23 pages.*

(Continued)

*Primary Examiner* — Wenpeng Chen
(74) *Attorney, Agent, or Firm* — McClure, Qualey & Rodack, LLP

(57) ABSTRACT

An example-based 2D to 3D image conversion method, a computer readable medium therefore, and a system are provided. The embodiments are based on an image database with depth information or with which depth information can be generated. With respect to a 2D image to be converted into 3D content, a matched background image is found from the database. In addition, graph-based segmentation and comparison techniques are employed to detect the foreground of the 2D image so that the relative depth map can be generated from the foreground and background information. Therefore, the 3D content can be provided with the 2D image plus the depth information. Thus, users can rapidly obtain the 3D content from the 2D image automatically and the rendering of the 3D content can be achieved.

46 Claims, 18 Drawing Sheets

U.S. PATENT DOCUMENTS

| | | | |
|---|---|---|---|
| 2004/0062419 A1* | 4/2004 | Roh et al. | 382/104 |
| 2004/0135780 A1* | 7/2004 | Nims | 345/419 |
| 2004/0176908 A1* | 9/2004 | Senda et al. | 701/211 |
| 2005/0185823 A1* | 8/2005 | Brown et al. | 382/103 |
| 2007/0286482 A1* | 12/2007 | Au | 382/173 |
| 2008/0075323 A1* | 3/2008 | Hartwig | 382/106 |
| 2008/0075366 A1* | 3/2008 | Jin | 382/175 |
| 2008/0166023 A1* | 7/2008 | Wang | 382/107 |
| 2008/0208547 A1* | 8/2008 | Kim et al. | 703/2 |
| 2008/0298689 A1* | 12/2008 | Ashbrook et al. | 382/224 |
| 2008/0309662 A1* | 12/2008 | Hassner et al. | 345/419 |
| 2009/0110236 A1* | 4/2009 | Huang et al. | 382/103 |
| 2009/0116732 A1* | 5/2009 | Zhou et al. | 382/154 |
| 2009/0219383 A1* | 9/2009 | Passmore | 348/44 |
| 2009/0228204 A1* | 9/2009 | Zavoli et al. | 701/208 |
| 2010/0046837 A1* | 2/2010 | Boughorbel | 382/173 |

OTHER PUBLICATIONS

Creating Depth Map from 2D Scene Classification, Yea-Shuan Huang et al, 3rd International Conference on Innovative Computing Information and Control, 2008. ICICIC '08, Jun. 18-20, 2008, pp. 69-73.*

Zhang, Z., et al.; "A Robust Technique for Matching Two Uncalibrated Images Through the Recovery of the Unknown Epipolar Geometry;" Rapport de rescherche, No. 2273, May 1994.

Taiwanese language office action dated Jun. 26, 2012.

"Database as the Basis of the Digital 3D Video Content Generation Method;" 2008; pp. 84-88.

Liu, K.C., et al.; "Example-Based Depth Generation from Single Image for 3D Content;" IEEE; 2008; pp. 333-336.

Nedovic, V., et al.; "Depth Information by Stage Classification;" IEEE 11th International Conference; 2007; pp. 1-8.

* cited by examiner

EXAMPLE-BASED TWO-DIMENSIONAL TO THREE-DIMENSIONAL IMAGE CONVERSION METHOD, COMPUTER READABLE MEDIUM THEREFOR, AND SYSTEM

This application claims the benefit of Taiwan application Serial No. 97127534, filed Jul. 18, 2008, the subject matter of which is incorporated herein by reference.

BACKGROUND OF THE INVENTION

1. Field of the Invention

The invention relates in general to a method for generating three-dimensional image content, and more particularly to an example-based two-dimensional to three-dimensional image conversion method, and an image conversion system.

2. Description of the Related Art

As the computer technology is developed rapidly, three-dimensional (3D) modularized software and animation software products are increasingly available in the industry. For example, one can use TrueSpace, 3D Studio Max, AutoCAD R14, 3D Webmaster, Live Picture, Division, or Sense 8 WTK R6. These software programs share some features in common. For example, they may complete the model, image processing, sound effect recording and the whole 3D layout integrating at the same time; they may provide some layout examples, objects, sound effects and materials which the user can make use of or modify so as to reduce lead-time; they may improve the interaction among objects in the virtual layout so as to make the 3D environment approximate to the real world. From the development and features of these software programs, it can be seen that the way for generating the 3D content is an important issue in the 3D industry.

On the other hand, a stereoscopic display capable of simulating the 3D stereoscopic visual effect has also been commercialized. Conventionally, according to the principle that the distance between two eyes (left and right eyes) of the human being forms different focuses which cause depth perception for the brain, the stereoscopic display provides different images for the two eyes of a viewer so as to make the viewer percept a multifocal image and achieve the purpose of 3D displaying. In this case, in order to percept the 3D image effect, the viewer needs to wear a pair of dedicated eyeglasses. In addition, there is a flat panel display, such as a liquid crystal display, a plasma display panel, or a projection stereoscopic display, which enables the user to acquire the 3D visual effect by casting multi-view images without the need of wearing the dedicated eyeglasses. For example, Philips presents a stereoscopic display based on the 3D display technology (referred to as WOWvx). Theoretically, using a 2D image with corresponding depth information, i.e., an original 2D image (color image) with a depth map corresponding to the 2D image, a stereoscopic image with at least two different viewing angles for left and right eyes can be obtained by way of simulation, or through the displaying of a multi-view stereoscopic display.

However, the popularization and application field of the stereoscopic display have been limited for lack of the 3D content that the stereoscopic display can utilize. Thus, in academic and professional practice, it is an important subject to generate a 3D content quickly and conveniently so that the stereoscopic display can output a 3D image by using the 3D content.

Because the image content is mainly based on the 2D image in the current information environment, it will be shown in the following that how the 2D image can be converted into the 3D content by the prior artisan.

In a conventional 2D/3D image converting technique, the method began with searching all the objects' edges in a whole 2D image, and then determined the objects in the order from front to rear by way of analysis of the color contrast thereof. This method was preferably applied to an image without significant segregation among the objects, such as a landscape scenery image. However, if the 2D image obviously had a number of objects such as people, cars, and buildings, while the objects of people and cars may not be defined, an error may occur in depth prediction.

In addition, Dynamic Digital Depth (DDD) in the United States presented a 3D software tool. The method thereof mainly relies on one's manual computer operations to add and modify the edge and depth relation of different objects in a 2D image. If the depth prediction generated automatically by software had the disappointing result, further modification by the manual operation is usually required to meet the needs. This is time consuming.

Further, Philips presented a software tool referred to as Bluebox, which provides user interfaces so that the user may convert the video content into the 3D content by way of manual-oriented semi-automatic operation.

Concerning to the depth prediction to generate 3D content, the above prior art may be limited to some specific types of 2D image content, or may be relied on modification by the manual operation.

SUMMARY OF THE INVENTION

Consistent with the invention, there is provided an example-based two-dimensional to three-dimensional image conversion method, a computer readable medium therefor and an image conversion system.

According to a first exemplary embodiment consistent with the present invention, an image conversion method of converting an input two-dimensional image into three-dimensional image content is provided. The method includes the steps of: obtaining, from an image database, a matched background image, which most closely approximates a content of the input two-dimensional image; performing a rectification operation to obtain a rectified background image according to the matched background image and the input two-dimensional image, wherein the rectified background image and the input two-dimensional image have the same image-capturing plane; performing a segmentation operation on the input two-dimensional image to obtain a segmented image, which comprises a plurality of patches; performing a foreground and background detection operation to separate the patches of the segmented image into a foreground patch group and a background patch group according to the input two-dimensional image, the rectified background image and the segmented image; and performing a depth estimation operation to set a depth value corresponding to each of the patches of the background patch group and the foreground patch group and to obtain a depth map of the input two-dimensional image according to depth information provided by the rectified background image. The three-dimensional image content is based on the input two-dimensional image and the depth map.

According to a second exemplary embodiment consistent with the present invention, an image conversion method of converting an input two-dimensional image into three-dimensional image content is provided. The method includes the steps of: selecting one of a plurality of example background images of an image database as a matched background image; performing a rectification operation to rectify the matched background image, such that the rectified matched background image and the input two-dimensional image are located on the same reference plane, to obtain a rectified background image according to the matched background image and the input two-dimensional image; performing a segmentation operation on the input two-dimensional image to obtain a segmented image, which comprises a plurality of patches; performing a foreground and background detection operation to separate the patches of the segmented image into a foreground patch group and a background patch group according to the input two-dimensional image, the rectified background image and the segmented image; and performing a depth estimation operation to set a depth value corresponding to each of the patches of the background patch group and the foreground patch group and to obtain a depth map of the input two-dimensional image according to depth information provided by the rectified background image. The three-dimensional image content is based on the input two-dimensional image and the depth map.

According to a third exemplary embodiment consistent with the present invention, an image conversion method of converting an input two-dimensional image into three-dimensional image content is provided. The method includes the steps of: selecting one of a plurality of example background images of an image database to serve as a matched background image, wherein a content of the matched background image most closely approximates a content of the input two-dimensional image in the example background images; performing a rectification operation to rectify the matched background image, such that the rectified matched background image and the input two-dimensional image are located on the same reference plane, to obtain a rectified background image according to the matched background image and the input two-dimensional image; performing a segmentation operation on the input two-dimensional image to obtain a segmented image, which comprises a plurality of patches, wherein the patches respectively represent correspondingly homogeneous pixels in the input two-dimensional image; and performing a foreground and background detection operation according to the input two-dimensional image, the rectified background image and the segmented image. The step of performing the foreground and background detection operation comprises: performing a subtraction operation on the input two-dimensional image and the rectified background image; and performing a foreground and background classification according to a result of the subtraction operation and the segmented image in order to classify the patches of the segmented image into a foreground patch group and a background patch group. The image conversion method further includes the steps of: performing an object detection operation on the foreground patch group in order to determine whether there is any patch of the foreground patch group satisfying at least one object feature, and performing an boundary smoothing process on each patch satisfying the object feature to obtain an adjusted foreground patch group, which is based on the patches corresponding to the boundary smoothing process; and performing a depth estimation operation according to depth information provided by the rectified background image in order to assign a depth value corresponding to each of the patches of the background patch group and the adjusted foreground patch group and to obtain a depth map of the input two-dimensional image. The three-dimensional image content is based on the input two-dimensional image and the depth map.

According to a fourth exemplary embodiment consistent with the present invention, a computer readable medium having computer executable data is provided. The computer executable data includes executing codes for executing the image conversion method to convert an input two-dimensional image into three-dimensional image content.

According to a fifth exemplary embodiment consistent with the present invention, an image conversion system for converting a two-dimensional image into three-dimensional image content is provided. The system includes a memory device and a microprocessor. The microprocessor is coupled to the memory device and is for reading commands stored in the memory device to implement the above-mentioned image conversion method.

According to a sixth exemplary embodiment consistent with the present invention, an image conversion system for converting an input two-dimensional image into three-dimensional image content is provided. The system includes an image matching unit, a rectifying unit, a segmenting unit, a foreground and background detecting unit and a depth estimating unit. The image matching unit determines a content of the input two-dimensional image, which most closely approximates a matched background image, according to an image database. The rectifying unit obtains a rectified background image, which is on the same image-capturing plane as the input two-dimensional image, according to the matched background image and the input two-dimensional image. The segmenting unit performs a segmentation operation on the input two-dimensional image to obtain a segmented image, which comprises a plurality of patches. The foreground and background detecting unit separates the patches of the segmented image into a foreground patch group and a background patch group by performing a subtraction operation on the input two-dimensional image and the rectified background image according to the input two-dimensional image, the rectified background image and the segmented image. The depth estimating unit sets a depth value corresponding to each of the patches of the background patch group and the foreground patch group to obtain a depth map of the input two-dimensional image according to depth information provided by the rectified background image. The three-dimensional image content is based on the input two-dimensional image and the depth map.

The invention will become apparent from the following detailed description of the preferred but non-limiting embodiments. The following description is made with reference to the accompanying drawings.

DETAILED DESCRIPTION OF THE INVENTION

The following exemplary embodiments consistent with the invention are provided to an example-based two-dimensional (2D) to three-dimensional (3D) image conversion method, a computer readable medium thereof and an image conversion system. With respect to the 2D image to be converted into the 3D content, a matched image to the 2D image is found from a digital image database (example-based or content-based image database), which has depth information or from which depth information can be generated. Foreground and background detection operation is then performed and depth values of the foreground and the background are estimated according to the depth information of the found image so that the 3D content can be generated. That is, the 3D content can be provided according to the 2D content plus the format of the depth information. With the 3D content, stereo views for the right and left eyes or multiple stereo views can be generated for different stereoscopic displays to provide the stereoscopic effect. Hence, the user can obtain the 3D content for an image in an automatic and convenient manner. In addition, the interactive effect of automatically generating the 3D content may also be achieved.

First Exemplary Embodiment

Figure 1:
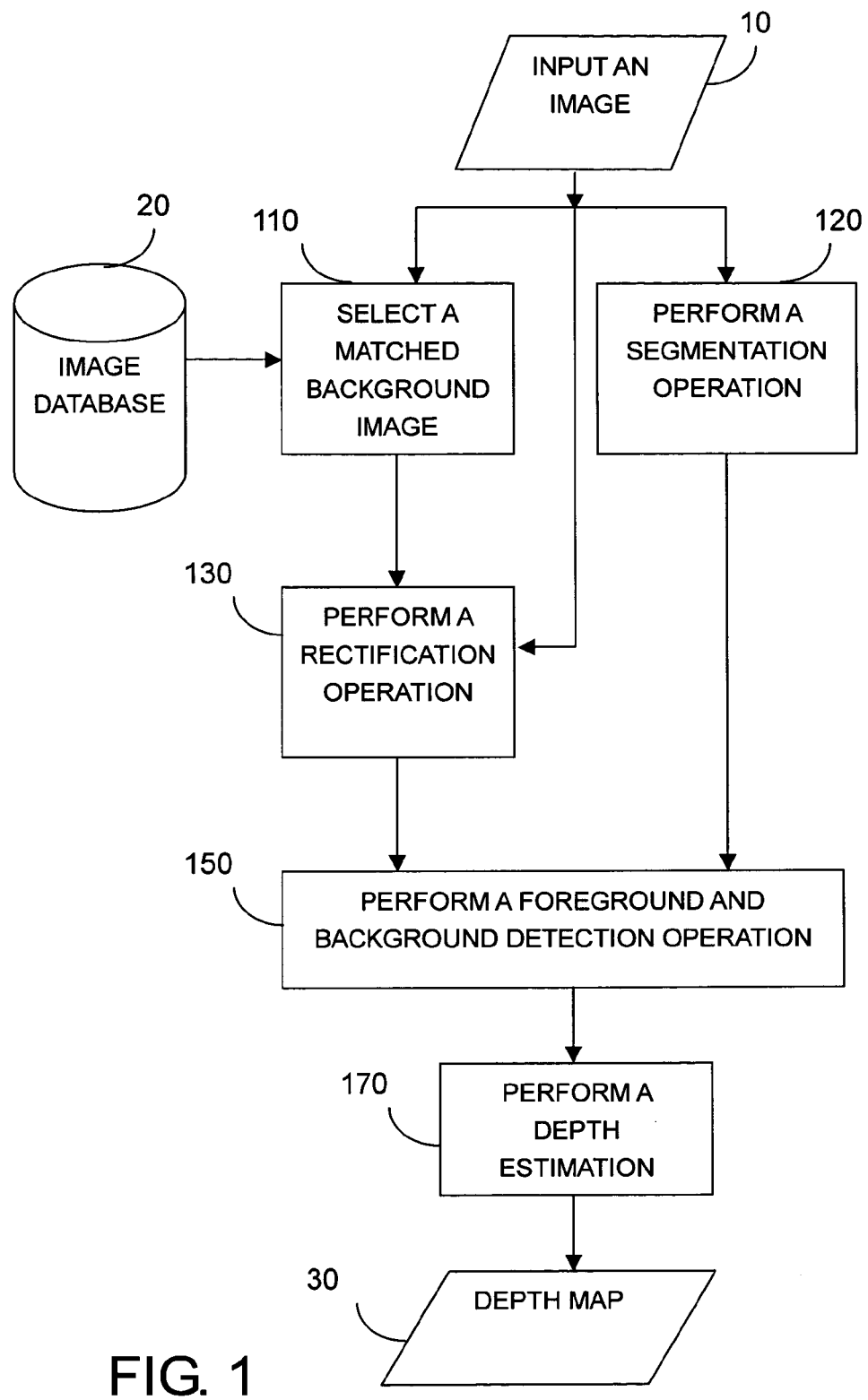
FIG. 1 is a flowchart showing an image conversion method of converting a two-dimensional image into three-dimensional image content according to a first exemplary embodiment consistent with the present invention.

FIG. 1 is a flow chart showing an image conversion method of converting a two-dimensional image into three-dimensional image content according to a first exemplary embodiment consistent with the invention. As shown in FIG. 1, an input two-dimensional image 10 is to be converted into the three-dimensional image content, which is obtained based on a depth map 30. For example, the three-dimensional image content includes the depth map 30 of the two-dimensional image 10 plus the two-dimensional image 10. One of ordinary skill in the art can determine the output format of the three-dimensional image content according to the actual requirement. Since the image conversion method is based on example images, at least one image database 20 has to be provided. The image database 20 may be a digital image database including a plurality of example background images serving as a reference for depth information comparison.

As shown in step 110, one of the example background images of the digital image database 20 is selected as a matched background image. Among these example background images, the content of the matched background image most closely approximates the content of the input two-dimensional image 10.

As shown in step 130, a rectification operation is performed on the matched background image and the input two-dimensional image 10 so that the matched background image is rectified to be located on the same reference plane as the input two-dimensional image, and a rectified background image may be thus obtained, wherein the rectified background image and the input image have the same image-capturing plane.

As shown in step 120, a segmentation operation is performed on the input two-dimensional image. The pixels with the similar properties in the input two-dimensional image 10 are classified into a plurality of patches to obtain a segmented image. These patches respectively represent the correspondingly pixels having similarity in the input two-dimensional image 10. In addition, the order of step 120 has nothing to do with that of step 110 or 130. Thus, the step 120 may be performed before, after, simultaneously with, or in parallel with step 110 or 130.

Figure 3:
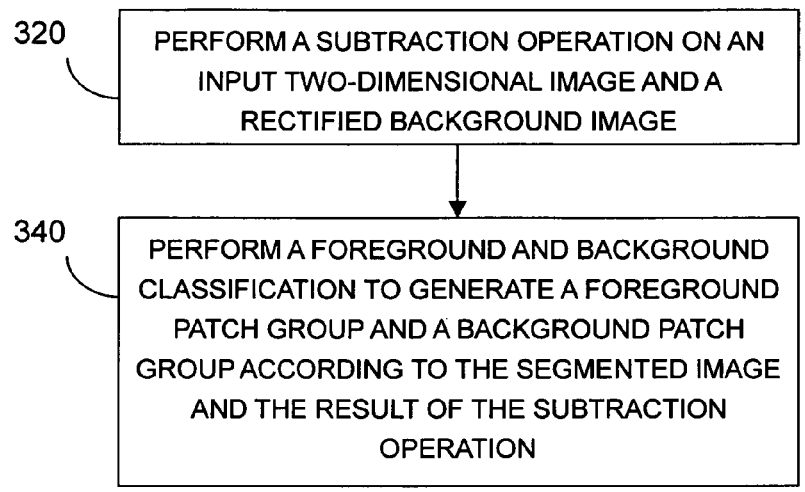
FIG. 3 shows an example of step 150 for performing the foreground and background detection operation.

Next, as shown in step 150, a foreground and background detection operation is performed to separate the patches of the segmented image into at least a foreground patch group and a background patch group according to the input two-dimensional image 10, the rectified background image obtained in step 130 and the segmented image obtained in step 120. FIG. 3 shows an example of step 150 of performing the foreground and background detection operation. As shown in FIG. 3, a subtraction operation is performed on the input two-dimensional image and the rectified background image in step 320. Any subtraction operation that is mainly to compare two images to find the difference therebetween so that foreground objects and background scene can be identified can be used to implement step 320. For example, pixel-based subtraction operations such as: differences or absolute differences between gray levels or color values of the pixels at corresponding coordinates in two images; a square root of a sum of squares of the differences between the gray levels or color values of the pixels at the corresponding coordinates in the two images. In addition, patch-based subtraction operations can be employed to implement step 320, wherein a number of pixels are grouped into a patch serving as a basic unit and the difference between two images is determined by comparison based on corresponding patches in the two images. In addition, in other examples, various subtraction operations, such as the pixel-based and the patch-based subtraction operations, are provided for implementation of step 320 selectively by way of automatic selection, default selection or manual selection. In step 340 of FIG. 3, a foreground and background classification is performed according to the result of the subtraction operation and the segmented image. In step 340, each of the patches of the segmented image can be determined as foreground or background, and the patches of the segmented image can be classified into the foreground patch group and the background patch group accordingly.

After the foreground and background detection operation is performed in step 150, step 170 may be performed. In step 170, a depth estimation operation is performed to set a depth value corresponding to each of the patches of the background patch group and the foreground patch group and thus to obtain the depth map 30 of the input two-dimensional image according to depth information provided by the rectified background image. The three-dimensional image content to be obtained is based on the input two-dimensional image 10 and the depth map 30. For example, if the depth information of the background image is indicated by one ground-vertical boundary for the background image, such as the ground-vertical boundary 501 of the background image 500 of FIG. 5A, the ground objects and vertical objects of the background image can be identified and can be assigned with corresponding depth values to indicate the background. As for other patches of the foreground, depth values can be assigned for them representing the foreground, in contrast with the patches of the background.

Second Exemplary Embodiment

Figure 2:
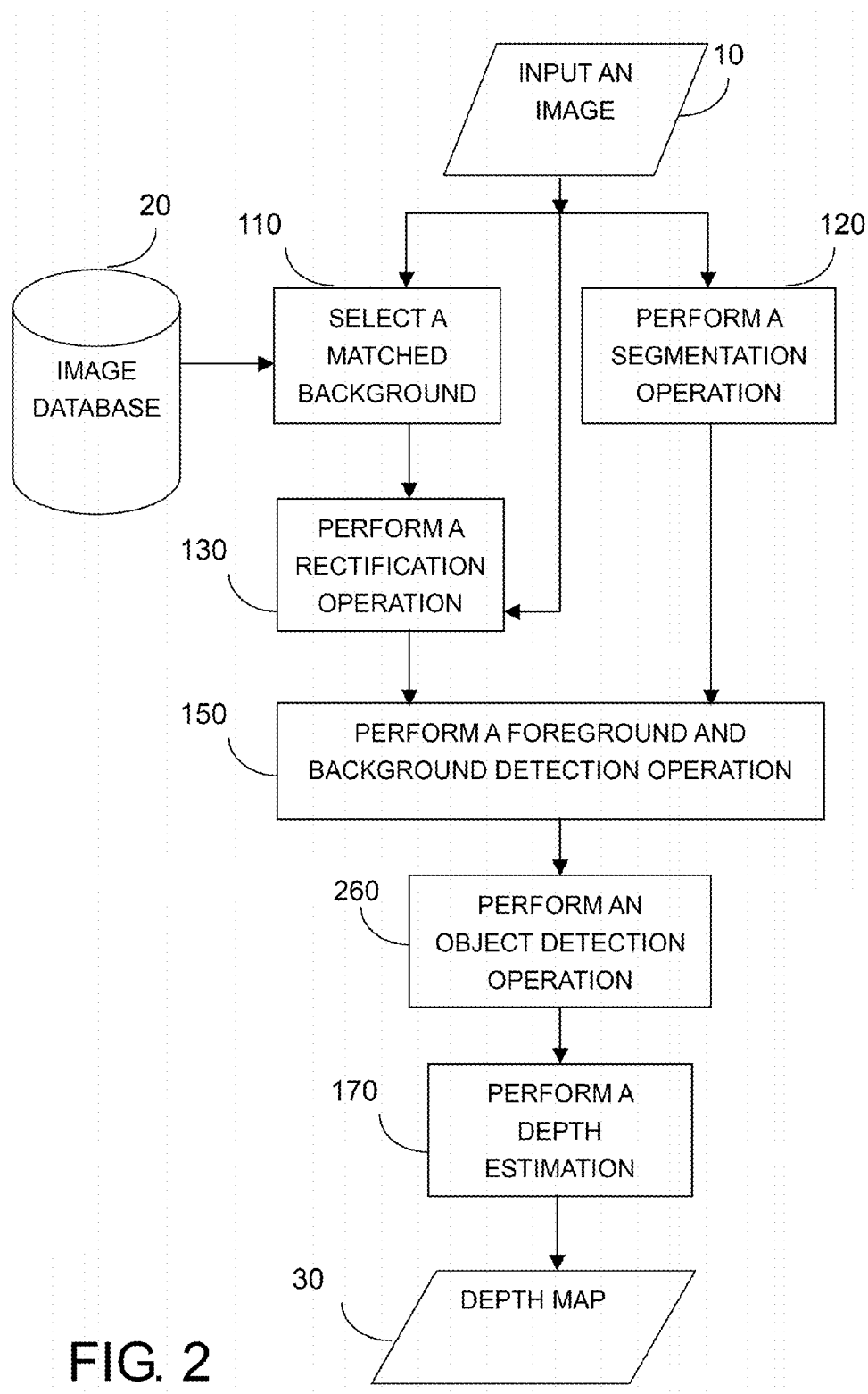
FIG. 2 is a flowchart showing an image conversion method of converting a two-dimensional image into three-dimensional image content according to a second exemplary embodiment consistent with the invention.

FIG. 2 is a flow chart showing an image conversion method of converting a two-dimensional image into three-dimensional image content according to a second exemplary embodiment consistent with the invention. The difference between this exemplary embodiment and the first exemplary embodiment of FIG. 1 is that the foreground patch group may be further processed after the step 150 of performing the foreground and background detection operation. Thus, the requirement of the reasonable and smoother contour of the real object represented by each patch can be satisfied to achieve better visual effects. As shown in FIG. 2, step 260 is performed after the step 150 of performing the foreground and background detection operation. In step 260, an object detection operation is performed on the foreground patch group to determine whether there is any patch of the foreground patch group satisfying at least one object feature, and a boundary smoothing process is performed on each patch satisfying the object feature to obtain the adjusted foreground patch group, which is based on these patches processed in the boundary smoothing process. In step 260, the object detection operation can be performed with respect to one or more objects, and the subject such as a human body, a building or a vehicle, for example, can be regarded as an object for detection. Next, as shown in step 170, the depth estimation operation is performed to assign the depth value corresponding to each of the patches of the background patch group and the adjusted foreground patch group according to the depth information provided by the rectified background image so that the depth map 30 of the input two-dimensional image is obtained.

With respect to the steps of the above-mentioned exemplary embodiments, the following will describe implementation using various approaches according to the above exemplary embodiments.

Digital Image Database and Depth Information

The exemplary embodiment consistent with the invention is based on the digital image database, which has the depth information or from which the depth information can be generated. Thus, the digital image database should include at least one example background image to provide the depth information. The image in the database, regardless of the content, is regarded as an example of the "background". The image database may be created by the user who shoots the photographs. For example, the photographs shot by the user may be used to create the image database. In other examples, the digital image database may be created by using one image or multiple sets of images, which may be created by the user who shoots the photographs or by other methods. For example, the digital image database may be obtained from a given image database, and further may be formed by classifying the images, collecting the images or selecting the images according to the requirements. As for the purpose of the digital image database, at least one example background image may also provide the depth information. For example, the user may take photographs in a scenic area, wherein the photographs include: a landscape photograph without people in a scene, as shown in the background image 510 of FIG. 6B; and a photograph with a man or an object taken in a similar scene or position, as shown in the image 610 of FIG. 6A. If the later (image 610) is regarded as the input image, then the former (background image 510) can be regarded as a background image. In addition, in the example where only one background image is obtained, the background matching operation may be omitted, and the depth map corresponding to the input image may be generated according to the background image by the other steps of the above exemplary embodiments. In an example where multiple background images are provided, such as the background images 500 and 510 or other images, the step 110 of the above exemplary embodiment may be performed to find the matched background image.

The digital image database is for providing the depth information, and there are multiple methods for obtaining the depth information of the background image.

Figure 5A:
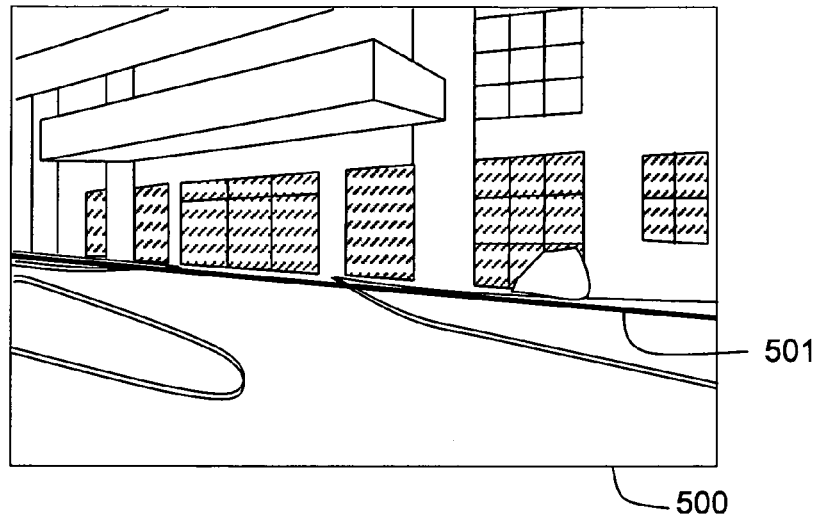
FIG. 5A is a schematic illustration of a background image.

For example, the digital image database further includes the depth information of these example background images. The depth information may be indicated by the relationship between the geometric depths of the objects in the image, a depth value of a pixel or a patch or the relative depth relationship between the pixels or patches, wherein the depth value represents the distance from an observation point. For example, the depth information of one of the example background images includes a ground-vertical boundary among ground and vertical objects in the example background image. As shown in FIG. 5A, the front door of the building in the background image 500 is regarded as the ground-vertical boundary 501 between the vertical objects and the ground objects. That is, in this example, the digital image database further includes the information of the relative position of the ground-vertical boundary corresponding to each background image inside. Thus, the boundary position (i.e., the ground-vertical boundary) among the ground and the vertical objects may be distinguished from the image so that the ground and the vertical objects can have different depth values. In one example, the depth information of these example background images can be given in advance and stored in the digital image database. In another example, the user may specify the depth information. For example, the user may input the coordinate positions associated with the ground-vertical boundary by way of software. In addition, a graphical interface program may be implemented to display the background image to let the user label the ground-vertical boundary on the background image. For example, the user may directly draw the ground-vertical boundary or select several points of the ground-vertical boundary so that the data may be inputted and stored into the image database.

Figure 4A:
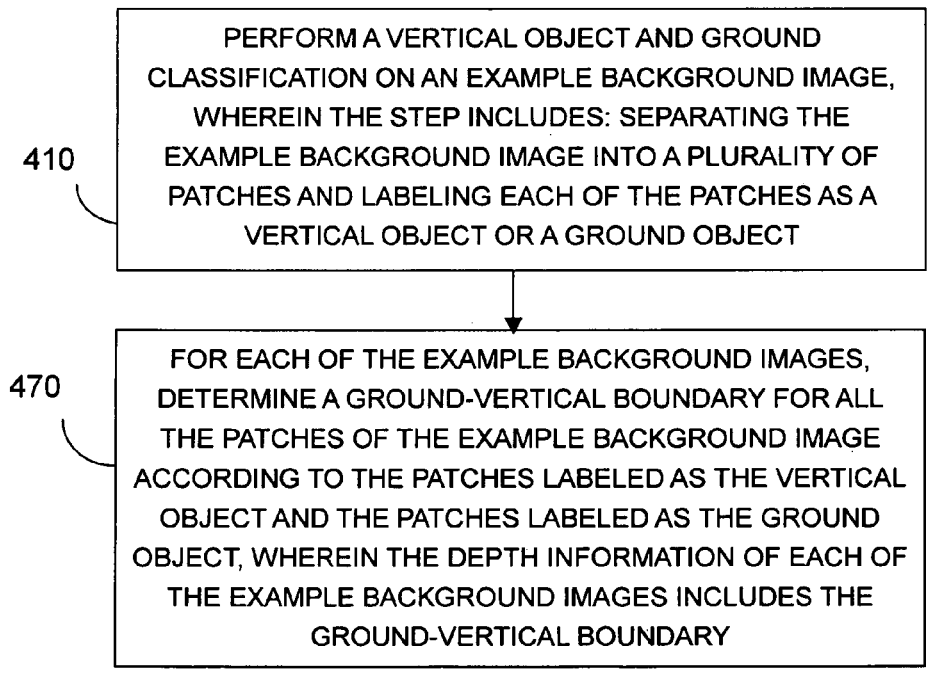
FIG. 4A is a flowchart showing a method of generating the depth information according to a first exemplary embodiment consistent with the invention.

In another example, the depth information of these example background images may be generated by a method of generating depth information according to another exemplary embodiment consistent with the invention. As shown in FIG. 4A, a vertical object and ground classification is performed on these example background images in step 410. The step includes: separating the example background image into a plurality of patches and labeling each of the patches of the example background image as a vertical object or a ground object. Next, in step 470, for each of the example background images, a ground-vertical boundary for all the patches of the example background image is determined according to the patches labeled as the vertical object and the patches labeled as the ground object. The depth information of each of the example background images includes the corresponding ground-vertical boundary.

Figure 5B:
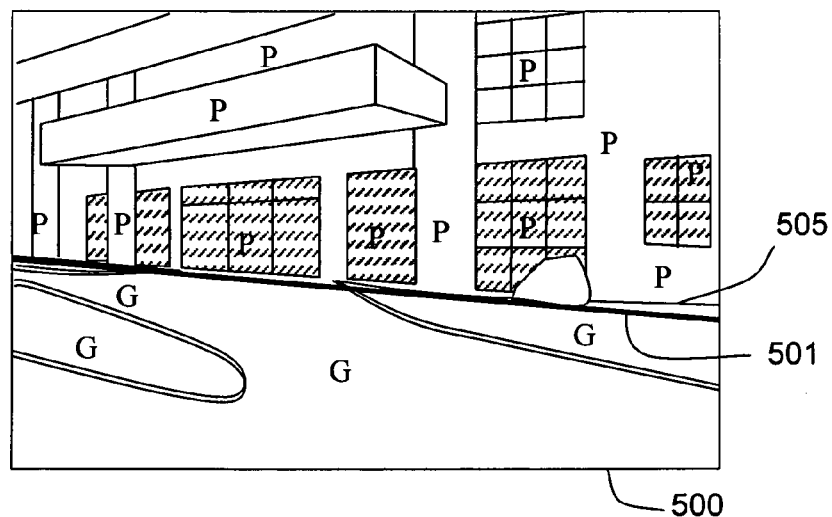
FIG. 5B is a schematic illustration showing the step 410 of performing the vertical object and ground classification on the background image.

In step 410, the separation may be implemented by the edge detection, in a histogram-based manner or by various conventional image separation methods, and the labeling may be implemented by inputting information or labeling by the user manually by software, indicating the patches to be regarded as the vertical or ground objects. As shown in FIG. 5B, "P" indicates that a certain patch is regarded as the vertical object, and "G" indicates that a certain patch is regarded as the ground. It is noted that the symbols "P" and "G" are only used for illustrative purposes. In practice, various data structures can be employed to indicate that a patch is regarded as the ground object or the vertical object, such as adding 0 and 1 to the data structure representing the patch for this purpose.

Figure 4B:
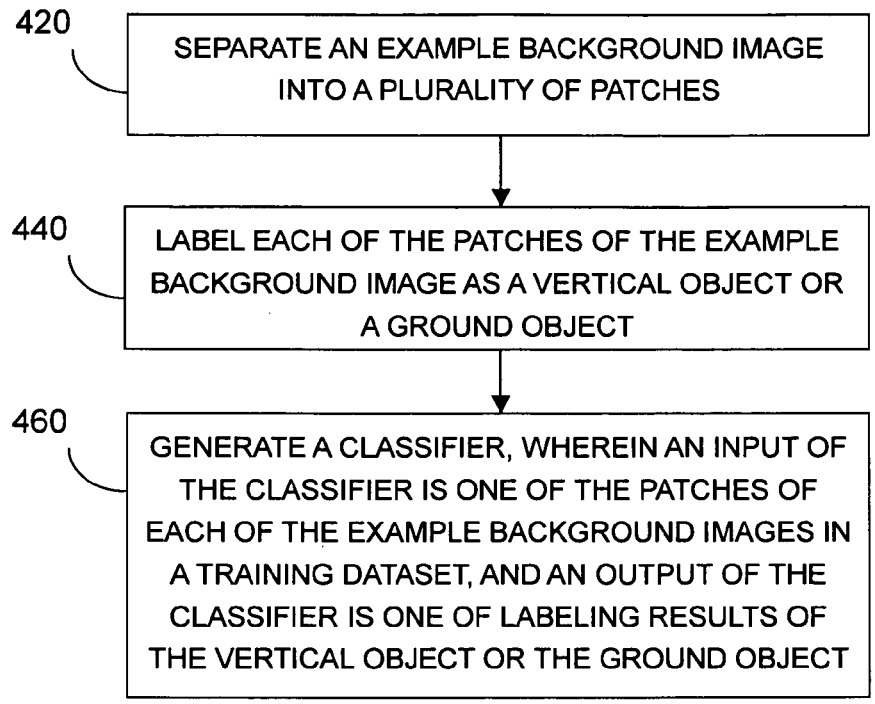
FIG. 4B shows another example of step 410 of performing the vertical object and ground classification in FIG. 4A.

As for the step 410 of performing the vertical object and ground classification, the artificial intelligence technique can be incorporated in another example, as shown in FIG. 4B. A classifier capable of automatically distinguishing the vertical object from the ground may be trained to achieve automatical generation of depth information from the digital image database. In this example, the machine learning or supervised learning method in the artificial intelligence technique is adopted. For example, the artificial neural networks and the fuzzy rules may be adopted to regard the example background images as the training dataset. As shown in FIG. 4B, the step of performing the vertical object and ground classification includes the following steps. In step 420, the example background image is separated into a plurality of patches. In step 440, each of the patches of the example background image is labeled as the vertical object or the ground object, as shown in FIG. 5B, for example. In step 460, the supervised learning method is employed to generate the classifier. An input of the classifier is a patch of each of the example background images of the training dataset, and an output of the classifier is one of the labeling results of the vertical object or the ground object.

Figure 4C:
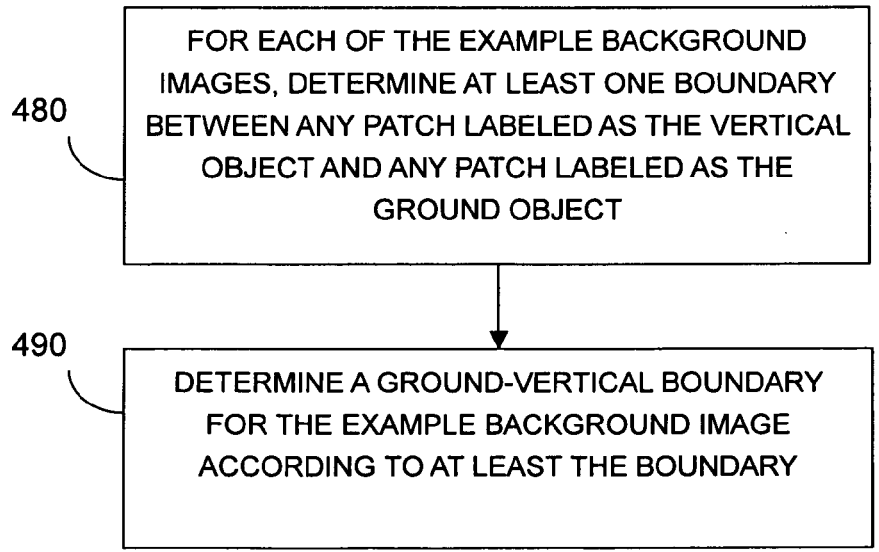
FIG. 4C shows another example of performing the step 470 of determining the ground-vertical boundary in FIG. 4A.

An example of step 470 of determining the ground-vertical boundary in FIG. 4A is shown in FIG. 4C and includes the following steps. In step 480, for each of the example background images, at least one boundary between any patch labeled as the vertical object and any patch labeled as the ground object is determined. As shown in the right side portion of FIG. 5B, a connection line segment 505 between the patch labeled as the vertical object and the patch labeled as the ground object is determined. In step 490, the ground-vertical boundary (e.g., the ground-vertical boundary 501 of the background image 500) for the example background image is determined according to at least the boundary. In step 490, the straight line Hough transform, for example, can be employed to find the ground-vertical boundary among the vertical objects and the ground objects.

In other examples, the depth information of the input image is obtained by performing a depth information estimation when the depth estimation step 170 is performed. The depth prediction estimation may be obtained with respect to the background portion and the foreground portion in the input image according to the computer visual technique, such as the vanishing point, the object size or the object shielding relationship.

Background Image Matching

Figure 6A:
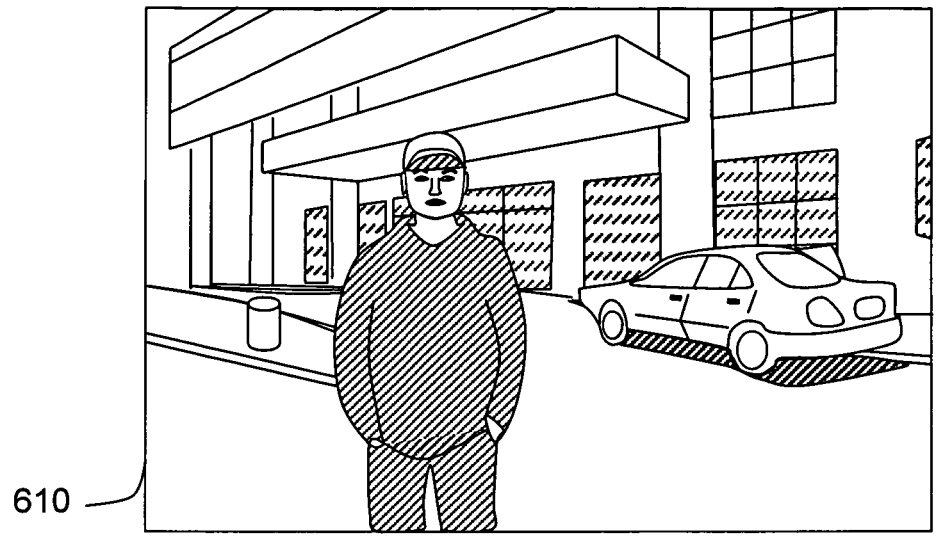
FIG. 6A is a schematic illustration of an input image.
Figure 6B:
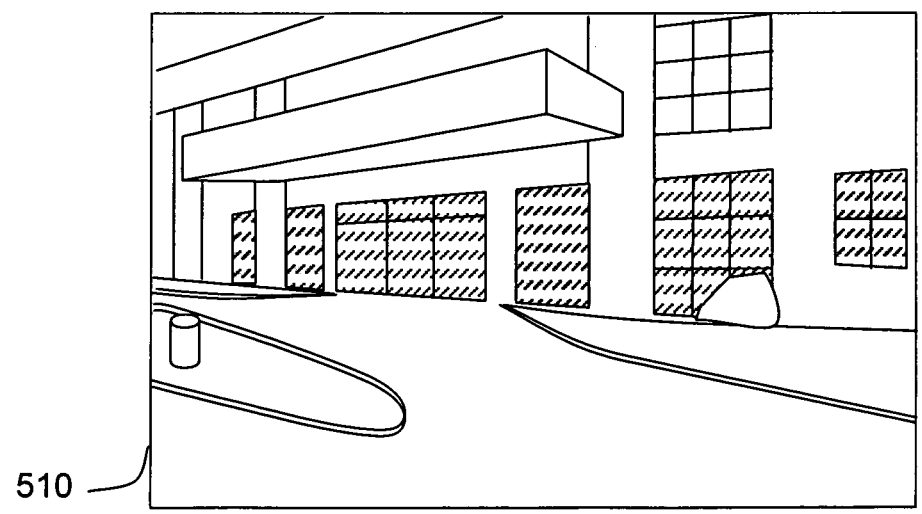
FIG. 6B is a schematic illustration which mostly matches with the background image.
Figure 7:
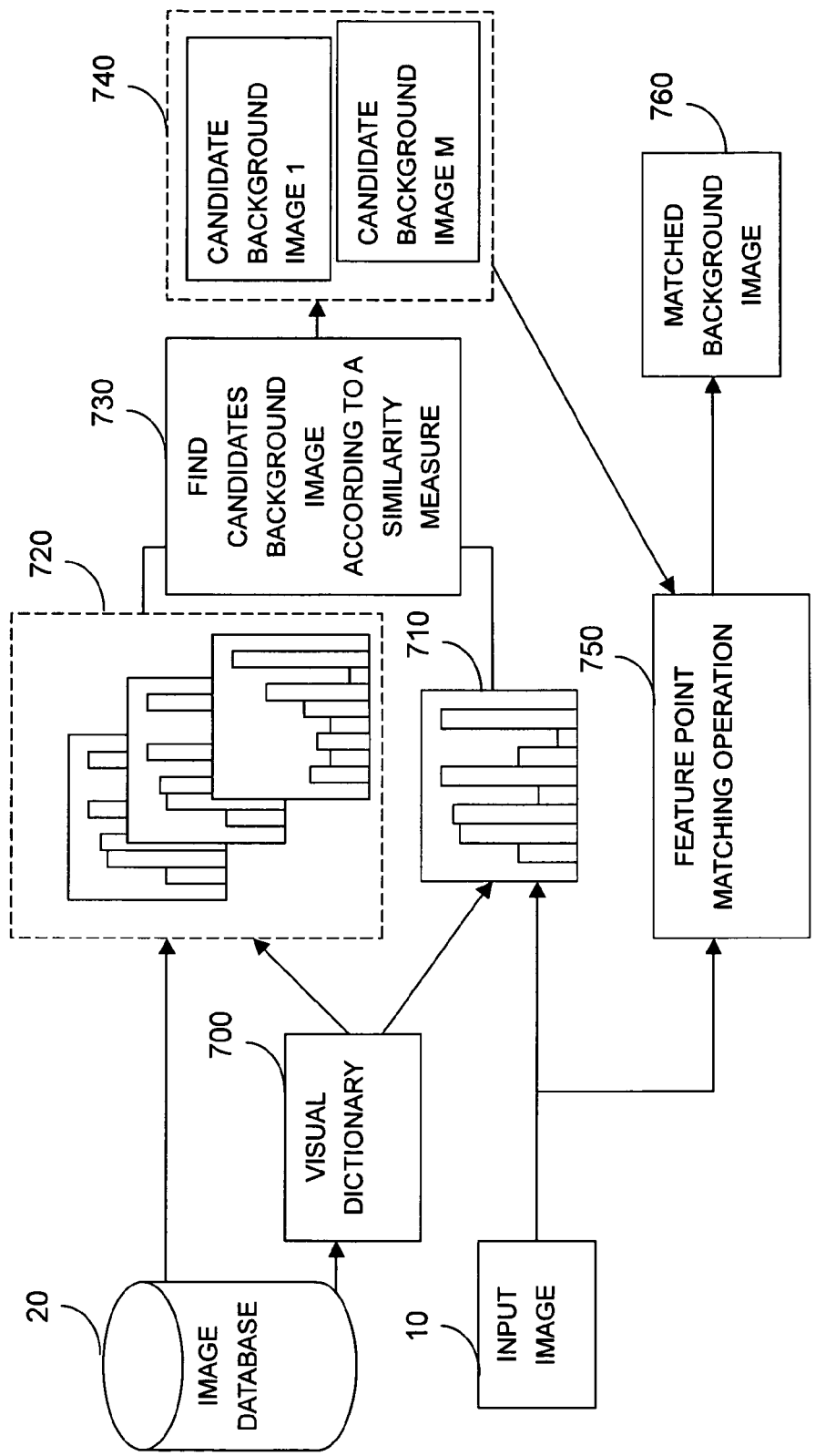
FIG. 7 is a schematic illustration showing an example of background image matching.

The step 110 of the image conversion method of converting the two-dimensional image into the three-dimensional image content may be described with reference to one example shown in FIG. 7. In FIG. 7, the content of a matched background image 760, such as the texture and color feature, should most closely approximate the content of the input image 10, such as the input image 610 shown in FIG. 6A. It is noted that in the drawings consistent with the present invention, the background image and the input image are originally color images with a resolution of 640×480 for example. For the sake of illustration, the black-and-white lines are used, wherein the hatched regions represents the darker color or the shade and is different from the actual color. In the example of FIG. 7, a bag of visual words is employed to find a set of candidate background images 740 from the example background images of the digital image database 20. Next, feature point matching is applied to find one of the candidate background images to serve as the matched background image 760, as shown in the background image 510 shown in FIG. 6B.

Among the object and scene classification techniques, the "bag of visual words" is a model which considers the frequency or occurrence of the features of the image instead of the spatial structure of the features. In the example of FIG. 7, for the feature extraction of each image, the texture features are represented using a filter bank, such as a plurality of mean values (e.g., 15 mean values) of the absolute responses of the Leung-Malik filter bank, and the color features are represented using three mean values of three primary colors (e.g., RGB) in the chromaticity domain. The texture features and the color features can be clustered by using an unsupervised K-means approach. After the feature extraction, a visual dictionary 700 may be defined according to the set of estimated cluster center values (i.e., the visual words) and their associated covariance. According to the visual dictionary 700, any background image in the database 20 may be filtered, and each pixel is associated with to the most approximate visual word in the dictionary. Thus, a map of indices can be generated from the dictionary. Consequently, the corresponding normalized histogram of the visual words can be computed for each background image, as shown in the histogram set 720 of FIG. 7.

For each input image 10, a corresponding visual word histogram 710 is generated to describe the texture and the color thereof according to the visual dictionary 700. In order to find some matched candidate background images from the image database 20, the operation shown in the block 730 of FIG. 7 is performed, wherein the operation includes comparing the histogram 710 with the histograms of the histogram set 720. The candidate background image can be found according to a similarity measure. The histogram used herein may be referred to as a texton histogram to describe its texture and color. For example, the similarity measure may be defined as follows:

$$\chi^2 = \frac{1}{2} \sum_{k=1}^{K} \frac{[h_i(k) - h_j(k)]^2}{h_i(k) + h_j(k)}, \quad (1)$$

wherein $h_i$ and $h_j$ represent two histograms and K represents the number of bins, which is also the number of visual words. The above-mentioned comparison may obtain the $X^2$ value corresponding to each background image. By way of sorting, the background images having smaller $X^2$ value are selected as the candidate background images, which are regarded as the background images having high similarity. The candidate background images may be, for example, the images in a candidate background image set 740 having M background images, e.g., M is 15, wherein M is smaller than the number of background images in the image database 20.

Next, in order to determine the best matched background image, a feature point matching operation is performed, as shown in the block 750, to use the feature points to describe each background image in the candidate background image set 740 and the input image 10. After the descriptor of the candidate background image and the descriptor of the input image 10 have been calculated, the pairs of matching features on each image are estimated. One of the candidate background images, which has the maximum number of pairs of matching features as compared with the input image 10, can be selected as the mostly matched background image 760, such as the background image 510 of FIG. 6B, wherein the matching features represent that the mostly matched background image 760 is mostly similar to the input image 10 in geometry and texture.

In the block 750, for example, when the feature point matching operation is being performed, each of the background images of the candidate background image set 740 and the input image 10 can be described using the feature points of the scale invariant feature transform (SIFT). The SIFT features and its method may be found in "Distinctive Image Features from Scale-invariant Keypoints," to David G. Lowe, International Journal of Computer Vision, vol. 60, pp. 91-110, 2004. In addition, other matching methods for the feature points in computer visual fields may also be adopted to implement the block 750.

Rectification Operation

Figure 8A:
FIGS. 8A to 8C are schematic illustrations showing images obtained after rectification operations are performed.
Figure 8B:
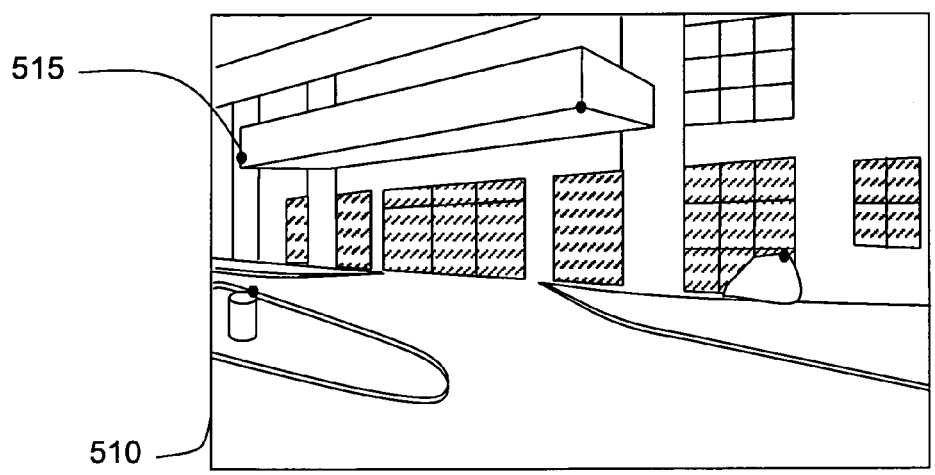

Since the matched background image obtained in step 110 may not completely match with the background of the input image 10, the rectification operation of step 130 is to reduce their differences on geometry. As shown in one example of FIGS. 8A to 8C, the matched background image 510 is firstly compared with the input image 610 to find a plurality of corresponding feature points, such as the feature point 615 of the input image 610 and the corresponding feature point 515 of the background image 510. The feature points may be determined, for example, geometrically by superposition. In addition, the SIFT feature matching method may be employed to perform the feature extracting and matching. In addition, if the SIFT feature matching has been employed in the example of step 110, the positions and the color values of the pairs of matching features (e.g., 26, 82, 200 or 304 pairs) can be obtained.

Figure 8C:
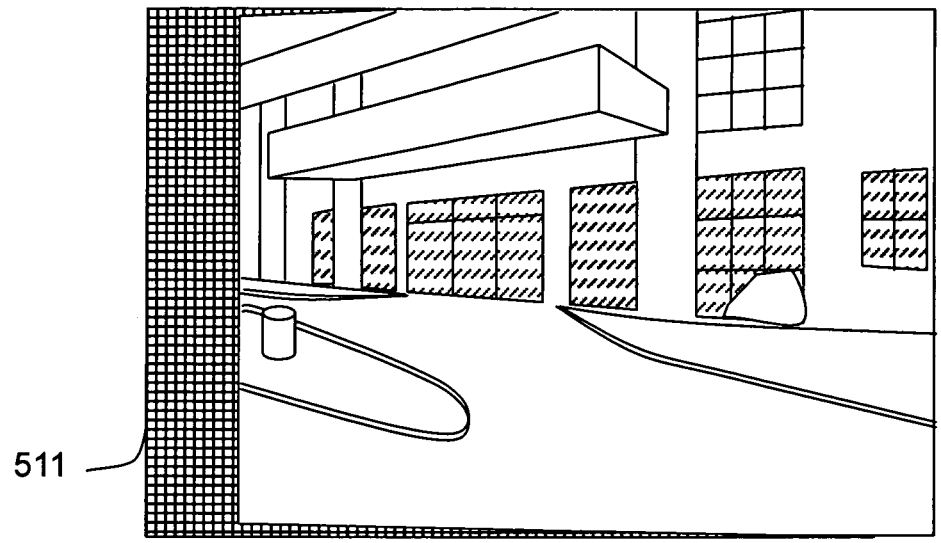

According to these corresponding feature points, the matched background image is rectified to be located at the same reference plane as the input two-dimensional image so that the rectified background image is obtained. In addition, in order to process the epipolar geometry difference between the background image 510 and the input image 610, it is necessary to obtain the fundamental matrix F according to the feature points and thus to rectify the background image 510 to be located on the same plane as the input image 610. Because the pairs of matching features provide the single linear constraint for the fundamental matrix F, the fundamental matrix F may be linearly estimated. As shown in FIG. 8C, the rectified background image 511 is obtained after the rectification of the matched background image 510.

In addition, in other examples, the estimation correctness in the example of the rectification operation can be enhanced by way of least squares approximation and random sample consensus (RANSAC).

Segmentation Operation

Figure 9:
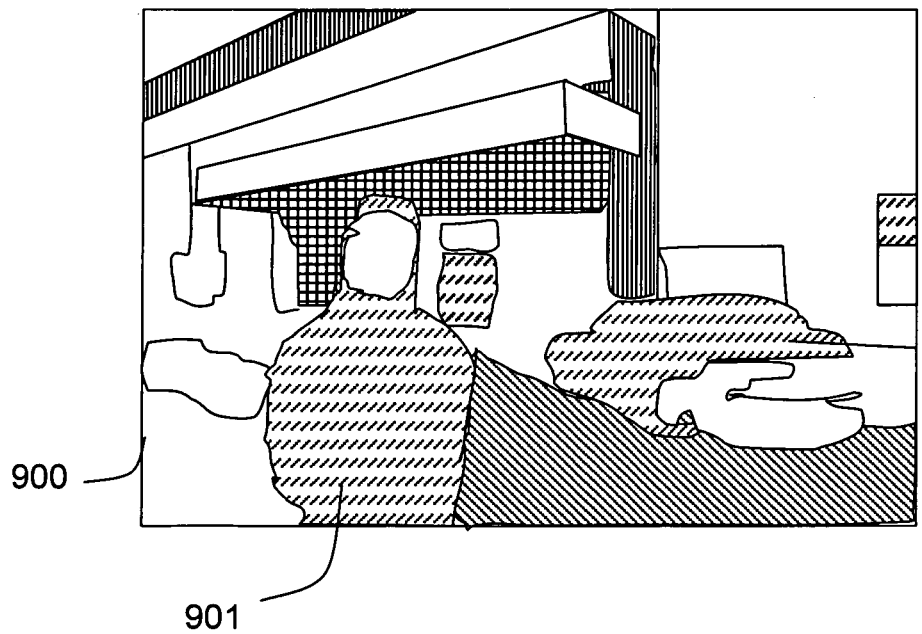
FIG. 9 is a schematic illustration showing a segmented image obtained after a segmentation operation of an input image is performed.

In order to perform the foreground and background detection operation shown in step 150, the segmentation operation is performed on the input two-dimensional image in step 120. FIG. 9 is a schematic illustration showing a segmented image obtained after the graph-based segmentation or image segmentation is performed on the input image 610. The patches respectively represent that some corresponding pixels in the input image 610 have the similarity of a certain property, such as color, intensity, or texture. For example, the patch 901 corresponds to a man, who stands, in the original input image.

Any segmentation operation satisfying the requirement of the foreground and background detection operation according to the exemplary embodiment consistent with the invention may be employed to implement the step 120. The segmentation operation can segment the input image into a plurality of patches for the comparison with the matched background image in step 150 so that the foreground objects can be distinguished. For example, Pedro F. Felzenszwalb and Daniel P. Huttenlocher disclose "Efficient Graph-Based Image Segmentation," International Journal of Computer Vision, Volume 59, Number 2, September 2004. In this example, the segmented result is determined according to three parameters, and different parameters correspond to different results obtained, wherein the parameter σ corresponds to the smoothing process for smoothing the input image before segmentation; the parameter k is employed in the threshold function, and the larger k corresponds to the larger segmented patch; and the parameter min represents the minimum patch size to be enhanced in the post-processing. FIG. 9 shows an example of the result obtained after the segmentation method is employed to the input image 610, wherein σ is 0.75, k is 500 and min is 500. In addition, if σ ranges from 0.4 to 0.6, k is 250 and min is 110, the patch obtained in the segmented result (not shown) is finer than the window of FIG. 9 because k is smaller than that of FIG. 9. In practice, the parameters may be adjusted according to the requirement of fineness. For example, the parameters may be set in advance, or adjusted automatically or manually according to the effect of the segmented result when the 2D to 3D image conversion method is performed, or may be automatically adjusted in combination with other methods, such as artificial intelligence learning. Similarly, in other examples, when other segmenting methods are employed, the parameters may also be set and adjusted, as mentioned above.

Segmentation ability plays an important role in the human visual perception. That is, the human visual perception can automatically classify similar objects or objects into different types and identify them. Many computer visual tasks still require image segmentation techniques with high efficiency and reliability. For example, the computer visual tasks in the stereoscopic and motion detection require using a suitable or uniform patch for the calculation of the corresponding pixels, and the image segmentation technique is also required to recognize non-uniform patches. The computer visual tasks in the aspect of the image recognition and indexing still require the image segmentation technique to recognize various portions from the images or to determine whether the images are matched.

Thus, the suitable image segmentation technique should have the following features. First, the technique can segment the 2D image and capture the important objects, groups or patches in a manner similar to the visual perception of the human being. These important patches often can represent main features or aspects of the image. In addition, the calculation is efficient, and the calculation time and the number of pixels in the image are preferably similar to the linearly proportional relationship. In order for the practical application, the computation speed is preferably higher than or nearly equal to that of the edge detection technique or other low-order image processing techniques. For example, if the computation speed of the image segmentation technique can reach several frames per second, the exemplary embodiment consistent with the invention may be applied to the related application of video processing, such as the real-time 2D to 3D conversion.

Foreground and Background Detection

The foreground and background detection operation of step 150 is to separate the patches of the segmented image into the foreground patch group and the background patch group, that is, to separate the foreground from the background. In FIG. 3, the subtraction operation is mentioned as one example of the step of the foreground and background detection operation. Based on the subtraction operation as the principle of separating the foreground and the background, other exemplary embodiments will be disclosed to further improve the performance of separation.

Figure 10:
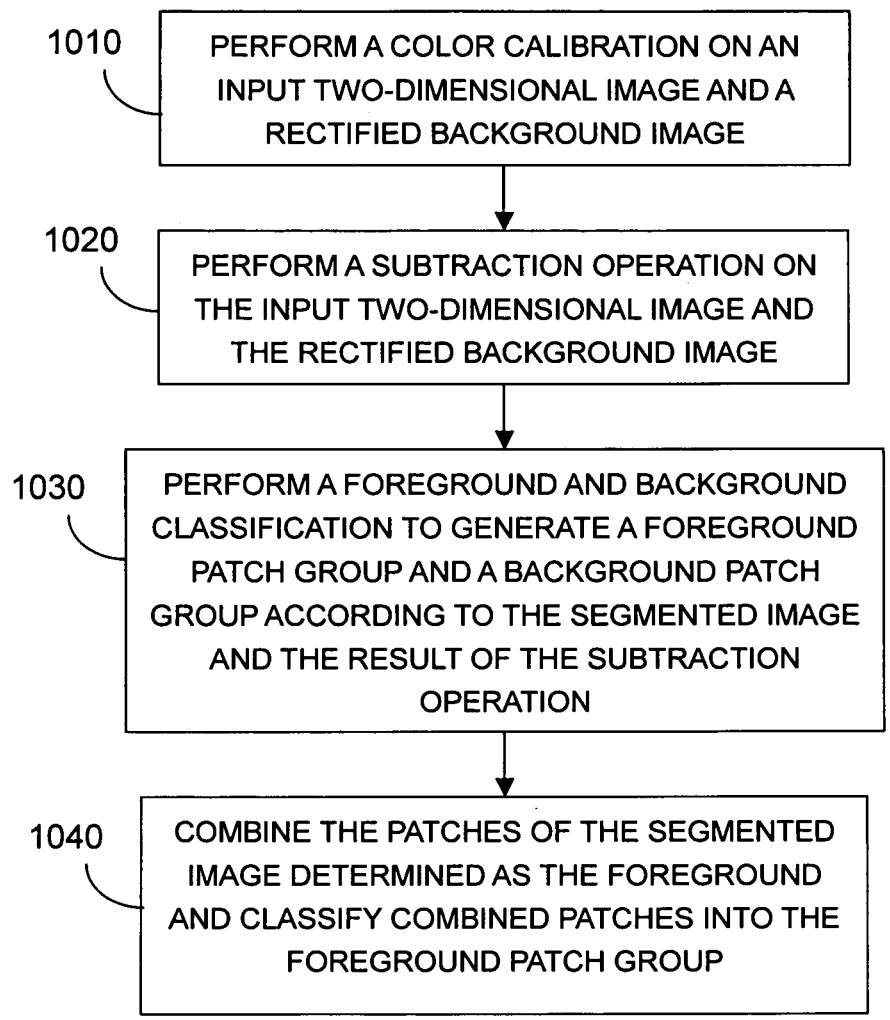
FIG. 10 is a flow chart showing a foreground and background detection operation based on a subtraction operation according to an embodiment consistent with the invention.

FIG. 10 is a flowchart showing the foreground and background detection operation based on the subtraction operation according to an exemplary embodiment consistent with the invention. As shown in step 1010, a color calibration is performed on the input two-dimensional image and the rectified background image. Then, as shown in step 1020, the subtraction operation is performed on the input two-dimensional image and the rectified background image. In step 1030, the foreground and background classification is performed according to the result of the subtraction operation and the segmented image to determine the patches of the segmented image as foreground or background. Next, in step 1040, the patches of the segmented image determined as the foreground are combined and classified into the foreground patch group.

The matched background image obtained in step 110 may not be consistent with the background of the input image 10 in color, so the color calibration operation of step 1030 functions to decrease the color difference therebetween. Thus, the result of the subtraction operation of step 1020 can further reflect the foreground information of the input image. As such, any color calibration method for obtaining the foreground information can be employed to implement the step 1030. For example, in the above example of step 110, the feature point matching has been applied so that the positions and the color values of the pairs of matching features can be obtained. Thus, similar to the calculation of the fundamental matrix F, the color values of some pairs of matching features may be employed to obtain color transformation matrix A for the color calibration in a linear manner.

Mukta Gore, Qi Wu and Tsuhan Chen disclose "COLOR TRANSFORMATION FOR COLOR CONSISTENCY ACROSS VIDEO CAMERA IMAGES," Department of ECE, Carnegie Mellon University. The color transformation of this article will be described as an example in the following. This article has disclosed that pixel values of pixels to be color transformed are selected from one frame to form a matrix X, and the other corresponding frame forms a matrix Y, wherein the matrix Y represents pixel values into which the pixels to be transformed in the matrix X will be transformed. If the pixel values are in form of values of three primary colors (R, G, B), the relationships between the matrices X and Y and a column matrix H are listed in the following:

$$X = \begin{pmatrix} R_{x1} & G_{x1} & B_{x1} & 0 & 0 & 0 & 0 & 0 & 0 \\ 0 & 0 & 0 & R_{x1} & G_{x1} & B_{x1} & 0 & 0 & 0 \\ 0 & 0 & 0 & 0 & 0 & 0 & R_{x1} & G_{x1} & B_{x1} \\ R_{x2} & G_{x2} & B_{x2} & 0 & 0 & 0 & 0 & 0 & 0 \\ 0 & 0 & 0 & R_{x2} & G_{x2} & B_{x2} & 0 & 0 & 0 \\ 0 & 0 & 0 & 0 & 0 & 0 & R_{x2} & G_{x2} & B_{x2} \\ & & & & \vdots \\ & & & & \vdots \\ & & & & \vdots \end{pmatrix}, Y = \begin{pmatrix} R_{y1} \\ G_{y1} \\ B_{y1} \\ R_{y2} \\ G_{y2} \\ B_{y2} \\ \vdots \\ \vdots \\ \vdots \end{pmatrix},$$

wherein X*H=Y. In order to solve the matrix equation X*H=Y, the singular value decomposition may be employed to obtain the column matrix H by calculating H=inv($X^T$*X)*($X^T$*Y). In step 1010, similar to the above-mentioned example, the color values of some pairs of matching features (e.g., three and fifteen pairs are selected from five patches having the similar color) may be substituted into the matrices X and Y so that the column matrix H can be obtained. The relationship between a to-be-color-transformed pixel x (e.g., represented by a column matrix of its color values) and a color-transformed pixel y (represented by a column matrix) may be represented by y=Ax. In this case, a transformation matrix A can be obtained by rearranging the elements of the column matrix H to form a row-wise 3×3 matrix.

Figure 16:
FIG. 16 is an image illustrating that minor differences between two images in geometry and color can cause a lot of noise.

As shown in step 1020, the subtraction operation is performed on the input two-dimensional image and the rectified background image. A direct method is based on the subtraction operation, in which the RGB color values represent the pixels. The matched background image is subtracted from the input image to obtain the foreground information. However, the variations in illumination of the two images still lead to confusion between the foreground and the background even if the color calibration is employed. Thus, the result obtained by the direct subtraction still has much noise. In another example, another color space, such as the YCrCb color domain, which is less sensitive to the illumination variations, is used instead of the RGB color space. If Tp is set to represent the threshold value of the color difference D at a certain image position P(x,y), the criterion for determining whether the pixel P(x,y) belongs to the foreground or the background are defined as:

$$D = \sqrt{(Cb_i - Cb_d)^2 + (Cr_i - Cr_d)^2} \qquad (2)$$

$$P(x, y) = \begin{cases} \text{foreground,} & \text{if } D \geq Tp; \\ \text{background,} & \text{if } D < Tp \end{cases} \qquad (3)$$

wherein $Cb_i$ and $Cr_i$ are the color values of the input image, and $Cb_d$ and $Cr_d$ are the color values of the matched background image. If Tp is set to be about 3.5, the result of the subtraction operation is shown in FIG. 16, wherein the black portion corresponds to the pixels determined as the foreground. The example corresponding to Equations (2) and (3) is an example of the pixel-based subtraction operation. As can be observed from FIG. 16, the minor differences between two images in the geometry and color can cause a lot of noise in FIG. 16, and the dark spot and holes are dispersed to influence the performance of the detection operation.

Since the criteria based on Equation (3) generates a lot of noise, the segmentation-based foreground detection operation is performed according to the result of the subtraction operation and the segmented image in step 340 of FIG. 3 and step 1030 of FIG. 10 so that the patches are separated into the foreground patch group and the background patch group. That is, the result of the subtraction operation serves as a parameter for determining the patches of the segmented image as the foreground or the background. Different determination criteria can be employed. For example, if the segmented image has K groups or patches, one patch $B_i$ (e.g., a patch 901 in the segmented image 900 of FIG. 9) has $N_i$ pixels, and the number of pixels in the patch $B_i$ which are determined as the foreground by the subtraction operation is equal to $n_i$, then another determination criteria is defined as follows:
If $$\frac{n_i}{N_i} \geq T_f,$$

then patch $B_i$ classified as the foreground (4),
wherein $T_f$ is the threshold value of the foreground ratio, which may be obtained according to the experience data or ground truth. If the threshold value $T_f$ of the foreground ratio is set to 0.4 and the determination criteria (4) is employed, then the result shown in FIG. 17 may be obtained, wherein the black patch represents that different patches are classified as the foreground.

In addition to the pixel-based subtraction operation of Equation (2) and the determination criteria (3), a patch-based subtraction operation can be used to implement the foreground and background detection operation as shown in FIGS. 3 and 10. For example, a correlation subtraction operation is performed on a correlation window of one of the input image and the rectified background image (e.g., a correlation window $W_i$ of the input image) and a patch of a search window (e.g., a search window $W_b$ of the matched background image) of the other one of the input image and the rectified background image having the larger patch. The result obtained after the correlation subtraction operation is performed on all the patches of one of the input two-dimensional image and the rectified background image represents the difference between the input two-dimensional image and the rectified background image. For example, Z. Zhang, R. Deriche, O. Faugeras, and Q. Luong disclose "A Robust Technique for Matching Two Uncalibrated Images Through the Recovery of the Unknown Epipolar Geometry," 1994. In the article, a correlation score ranging from −1 to +1 is defined. The correlation score of −1 represents that the two correlation windows are completely dissimilar to each other, while the correlation score (+1) represents that the two correlation windows are regarded as the same. A constraint can be assigned according to the correlation score to select the matched windows. With respect to the correlation point $m_1$ of the image $I_1$ and the correlation point $m_2$ in the search window of the image $I_2$, the correlation score is defined as:

$$Score(m_1, m_2) = \frac{\sum_{i=-n}^{n} \sum_{j=-m}^{m} [I_1(u_1+i, v_1+j) - \overline{I_1(u_1, v_1)}] \times [I_2(u_2+i, v_2+j) - \overline{I_2(u_2, v_2)}]}{(2n+1)(2m+1)\sqrt{\sigma^2(I_1) \times \sigma^2(I_2)}}, \quad (5)$$

wherein, $$\sigma(I_k) = \sqrt{\frac{\sum_{i=-n}^{n} \sum_{j=-m}^{m} I_k^2(u,v)}{(2n+1)(2m+1)} - \overline{I_k(u,v)}}, \text{ and}$$

$\sigma(I_k)$ is a standard deviation of the image $I_k$ in the neighborhood (2n+1)×(2m+1) of the pixel (u,v), and $\overline{I_k(u,v)}$ is the mean value of the image k in the pixel (u,v), wherein k=1, 2.

Figure 18:
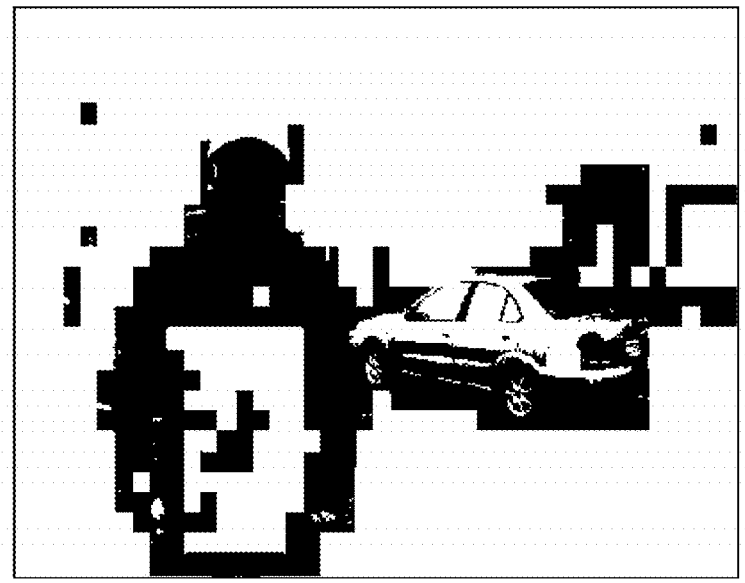
FIG. 18 is an image illustrating an example of a subtraction operation is performed by employing a correlation operation formula (5) according to a determination criterion (6).

Thus, the correlation operation formula (5) is applied to the foreground and background detection operation implemented in FIGS. 3 and 10 so that the example of another determination criteria may be defined as follows:
If the correlation score $Score(W_i, W_b) < T_w$, then $W_i$ is classified as the foreground (6), wherein the correlation threshold value $T_w$ is the constraint that can be obtained from the experience data. As shown in FIG. 18, the subtraction operation is performed by employing the correlation operation formula (5), according to the determination criteria (6). Different black patches are schematically judged as the foreground and background patches, wherein the correlation threshold value $T_w$ is set to 0.97, the segment threshold is set to 0.5, the patch size is set to 15, and the search size is set to 5. In addition, the segmented parameter k is 500, and the parameter min is 30. In addition, the noise in the result of FIG. 18 is less than that in the result of FIG. 16.

Figure 19:
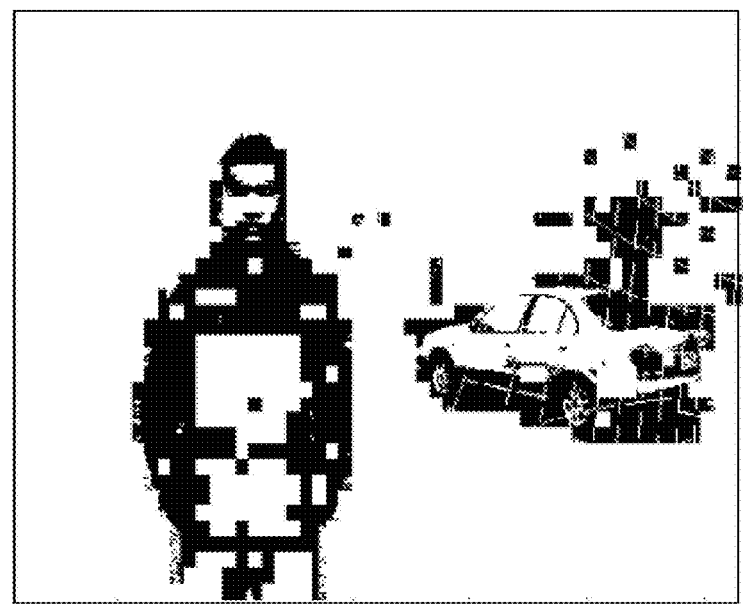
FIG. 19 illustrates an example of result by using a subtraction operation based on the correlation operation formula (5) according to a determination criterion (7).

In addition, in another example, the subtraction operation can further be based on the correlation operation formula (5) and the criterion for determining the background is according to the determination criteria (6) and the hue constraint. For example: if $((mean(hue) > T_{hue}) \cap (Score(W_i, W_b) < T_w)$, then $W_i$ is classified as the foreground (7), wherein $T_{hue}$ is the threshold value of hue and mean(hue) is the mean value of hue in a patch. FIG. 19 illustrates the result by using the subtraction operation based on the correlation operation formula (5) according to the determination criterion (7). In FIG. 19, different black patches represent the patches determined as the foreground, wherein the correlation threshold value Tw is set to 0.96, the threshold value of hue $T_{hue}$ is set to 0.4, the patch size is set to 15 (wherein n=m), and the search size is set to ¼ of the image size.

Figure 11:
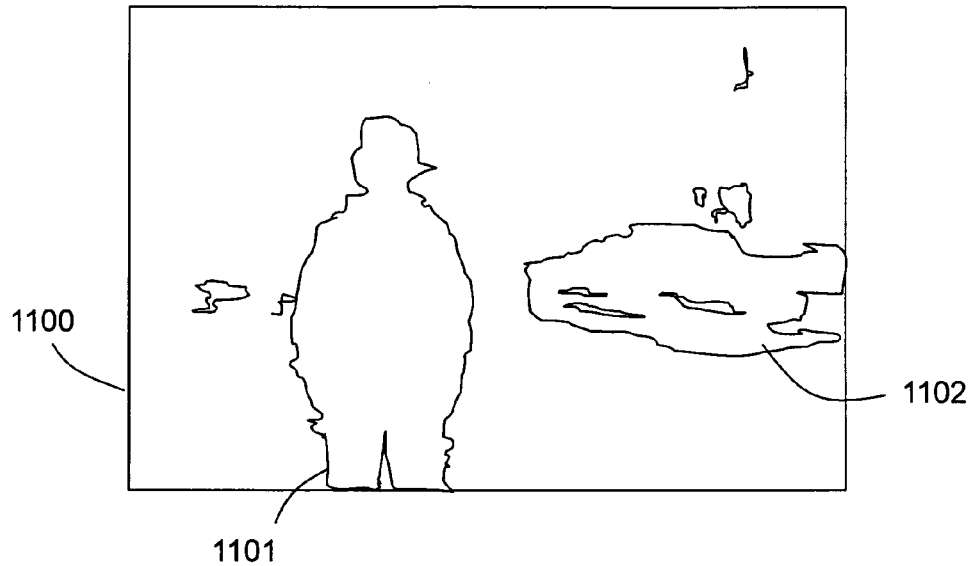
FIG. 11 is a schematic illustration showing a result obtained after the results of the foreground detection operation are combined.
Figure 17:
FIG. 17 is an image illustrating an example of black patch representing that different patches are classified as the foreground.

In step 1040, the patches of the segmented image determined as the foreground are combined and classified into the foreground patch group. For example, a connected component method is applied to combine the patches. In FIG. 11, the image 1100 shows the result generated by performing a 4-connected component method on the patches determined as the foreground, wherein many small patches of FIG. 17 are combined to form the patches 1101 and 1102. Finally, the patches 1101 and 1102 are labeled as foreground patches and classified into the foreground patch group.

In addition, in other example, many subtraction operations, such as the subtraction operations based on the pixel as the unit and based on the patch as the unit, are selectively provided, and one of the subtraction operations may be selected to implement the foreground and background detection operation by way of the automatic selection, the default selection or the user's selection, or the subtraction operation can be adjusted. As for the determination criteria for the foreground or the background, it is also possible to employ one or more from the determination criteria by way of selection, or to adjust the determination criteria.

Object Detection

In order to make the separated foreground satisfy the mental requirement of the completeness of the object (e.g., human, object, building, car) for the visual perception of the human being, the object detection operation is performed on the foreground patch group, in step 260 to determine whether there is any patch of the foreground patch group satisfying at least one object feature. In addition, the boundary smoothing process is performed on each patch satisfying the object feature to obtain the adjusted foreground patch group. The object detection operation may be performed to detect the human being or other objects or to detect both the human being and different objects. The object detection operation may be specified according to the content property of the image and the user's requirement. In particular, the human body has the dedicated meaning in the typical applications. Thus, the human feature detection operation may be performed, for example, to determine whether there is any patch of the foreground patch group satisfying a human feature, and to perform the boundary smoothing process on the boundary of each patch satisfying the human feature. For example, the human feature detection operation includes the human body detection, in which the human feature is the human-like contour, and the human face detection, in which the human feature is the human face feature. Any method can be employed to implement the step 260 as long as it can perform the human feature detection on the foreground obtained in step of foreground and background detection operation. In addition, with regard to the object, such as a car, an airplane, a building an animal, a plant or the object to be noted in a certain field, a dedicated object detection may be performed to detect at least one object to determine whether there is any patch of the foreground patch group satisfying the dedicated object feature, and to perform the boundary smoothing process on the boundary of each patch satisfying the dedicated object feature. For example, it is determined whether the foreground window is a car according to the size ratio or the aspect ratio in each of the foreground patches, and the contour thereof is additionally adjusted. In addition, in other examples, the unsupervised object detection technique can be applied additionally to detect more kinds of objects and to provide higher precision, and the probabilistic graphical model can be introduced to enable automatic detection.

Figure 12A:
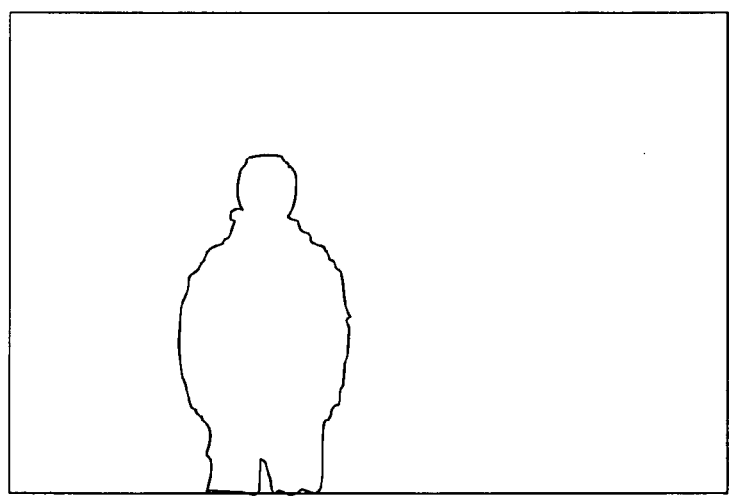
FIG. 12A is a schematic illustration showing a smoothing effect obtained after a pattern dilation is performed on the window 1101 of FIG. 11.

The smoothing process, such as the morphological erosion and dilation, may be used to smooth the zigzag portion on the contour of the foreground window. For example, the white patch of FIG. 12A shows the result of performing the pattern dilation on the patch 1101 of FIG. 11. As can be observed from the drawing, the noise of the edge of the contour of the window 1101 (i.e., the sawtooth portion) are eliminated or reduced.

However, errors may occur in other examples having the unclear boundary between the foreground and the background. As shown in FIGS. 6A and 9, the head (e.g., hair) of the human and the black glass of the door may cause the error in the separated patches or the combined patches. For example, the patches, which should originally be combined together, may be separated into several loosely connected patches, or the patches, which should not be combined together, are incorrectly combined together.

Figure 12B:
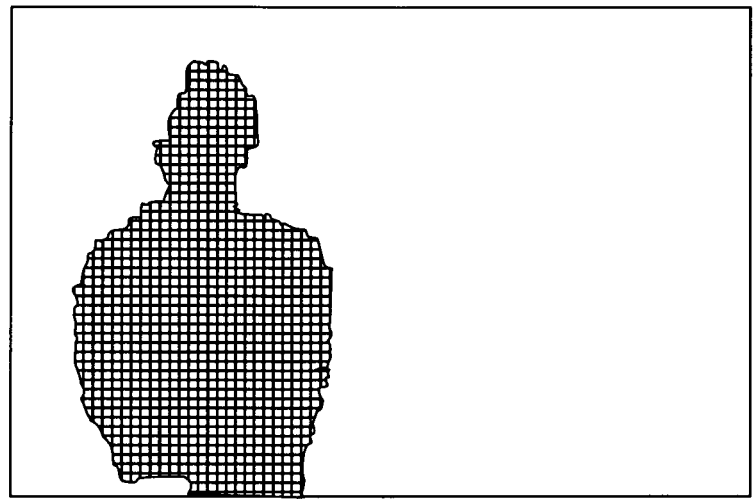
FIGS. 12B and 12C are schematic illustrations showing a human shape smoothing operation based on the principle component analysis.
Figure 12C:
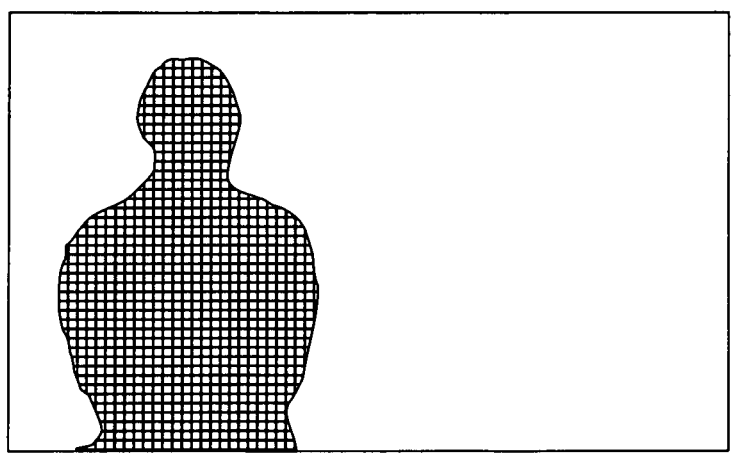

With respect to these situations, an example based on the principle component analysis (PCA) application will be described in the following to address the above-mentioned problems. More particularly, the example may be applied to the smoothing of the contour of the human body to re-calibrate the shape of the human. First, the PCA model is trained according to real data because prior information can be obtained according to the contour or shape of the human body. For example, edge detection is performed on the real human body contour, such as the human body contour of FIG. 12A, to find, for example, 200 control points serving as the prior information for the PCA model. The PCA model is employed to describe the contour of a certain feature of the human body, such as the contour of the human body, which is regarded as the lower-order principle component, wherein some zigzag contours are regarded as the high-order component. Next, for a new foreground patch resulted from segmentation as an input, as shown in the foreground window of FIG. 12B, the edge detection operation has to be performed on this input to find the control points (e.g., 200 points), wherein the PCA is employed to map all the control points (i.e., the boundary points) in the foreground patch to the principle space. The principle space only includes the human shape due to the prior information, and some zigzag contours are decreased because the zigzag contours on these boundary points are regarded as the high-order components. Finally, the boundary of the foreground patch of FIG. 12B can be smoothed, as shown in FIG. 12C. That is, the edge detection operation is performed on each patch satisfying the human feature according to the prior information, and the control points are found. A control point position adjustment is then performed to obtain the smoothed result according to the trained principle component analysis model.

Assign Depth Value

Figure 13A:
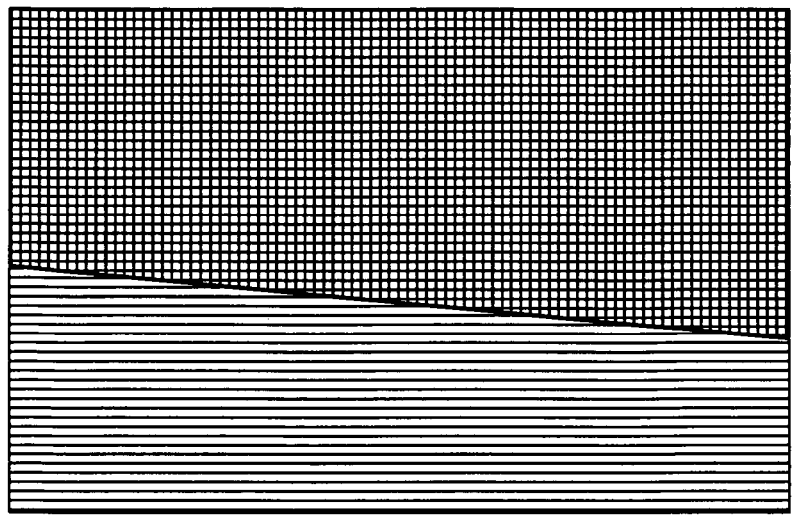
FIG. 13A shows a depth map obtained after the depth estimation operation is performed on the background image.
Figure 13B:
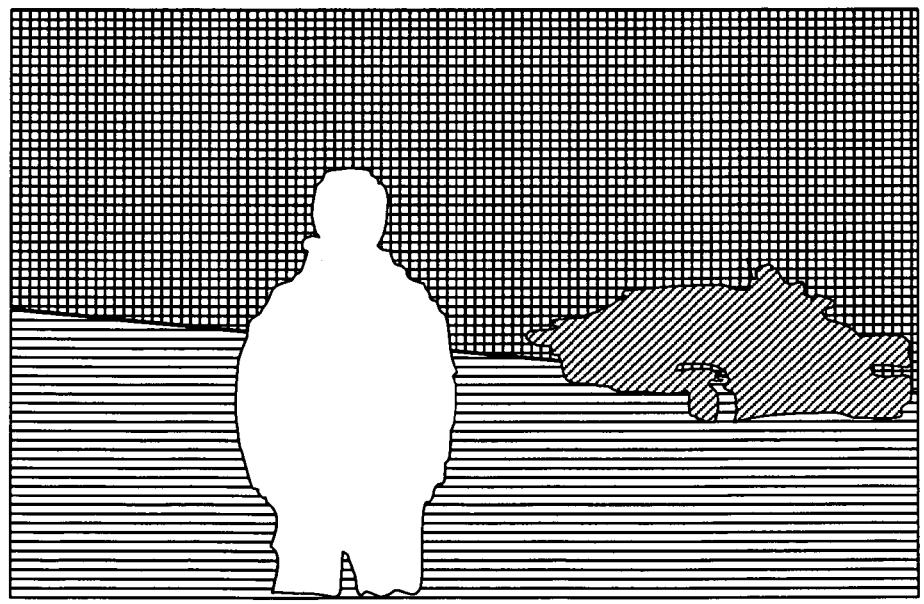
FIG. 13B shows a depth map obtained after the depth estimation operation is performed on the input image of FIG. 8A.
Figure 20:
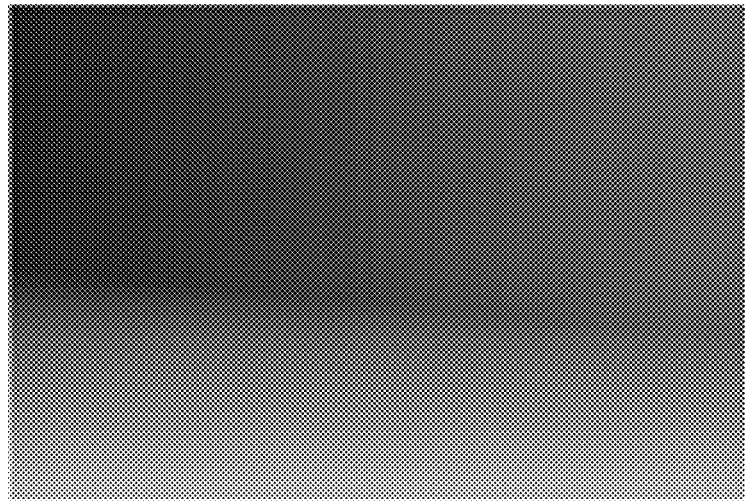
FIG. 20 shows an example of distribution of depth values in gray levels.
Figure 21:
FIG. 21 shows an example of a depth map in gray levels.

In step 170, the depth estimation operation is performed according to the depth information provided by the rectified background image. Because the rectified background image has the depth information, the background image have at least two different depths in principle. For example, if the depth information of the background image is represented by a ground-vertical boundary, for example, the ground-vertical boundary 501 of the background image 500 in FIG. 5A, the background image can be separated into ground and vertical objects. If 0 represents that the distance to the viewer is maximum and 255 represents that the distance to the viewer is minimum, two depth values can be assigned to the ground and the vertical object of the background image to represent that the distance to the observation point is farther or the gradual change (e.g., from 20 to 180) may be employed to represent the distance variation relationship. Referring to FIGS. 5A, 8C and 13A, FIG. 13A shows the distribution of the depth values of the background after estimation of the depth values, wherein the larger depth corresponds to the darker color and the longer distance to the viewer, while the smaller depth corresponds to the lighter color and the shorter distance to the viewer and FIG. 20 shows the distribution of the depth values in gray levels. In FIG. 13A, since the image is perspective and stereoscopic, the region at the bottom of the ground is regarded as having the minimum depth with respect to the background, and the continuous depth value variation is given along the direction of the ground-vertical boundary from near to far with respect to other ground portions and vertical surfaces. The foreground patch group may be set to the depth values which represents that they are near to the observation point in contrast to the background, with the same value, such as 200. FIG. 13B shows an example of the depth map and FIG. 21 shows the depth map in gray levels. In the example of the human body detection, the patch shown in FIG. 12A is determined as the human body by the human body detection. Thus, the depth value 200 may be given to represent that the patch is the nearest to the observation point. As for other foreground objects, the value 100 is given to represent that they are farther from the observation point. Thus, the color of the right-side patch of FIG. 13B (representing the car) is darker than that in the left-side patch. Thus, since step 260 of object detection is added, different depth values may be given to the patches of the foreground classified as different kinds of objects according to the detection results. According to the input image, such as the image 610 of FIG. 6A and the depth map of FIG. 13B, the 2D-plus-depth format can be employed for the generation of the stereo views for the left and right eyes to watch or multiple stereo views in the stereoscopic display. For example, four or nine views may be provided for the stereoscopic display to display the stereoscopic effect.

Other Exemplary Embodiments

The above-mentioned exemplary embodiments consistent with the invention may also be implemented by an image conversion system, such as a field programmable gate array (FPGA), an embedded system, an independent chip, or a typical universal microprocessor.

Figure 14:
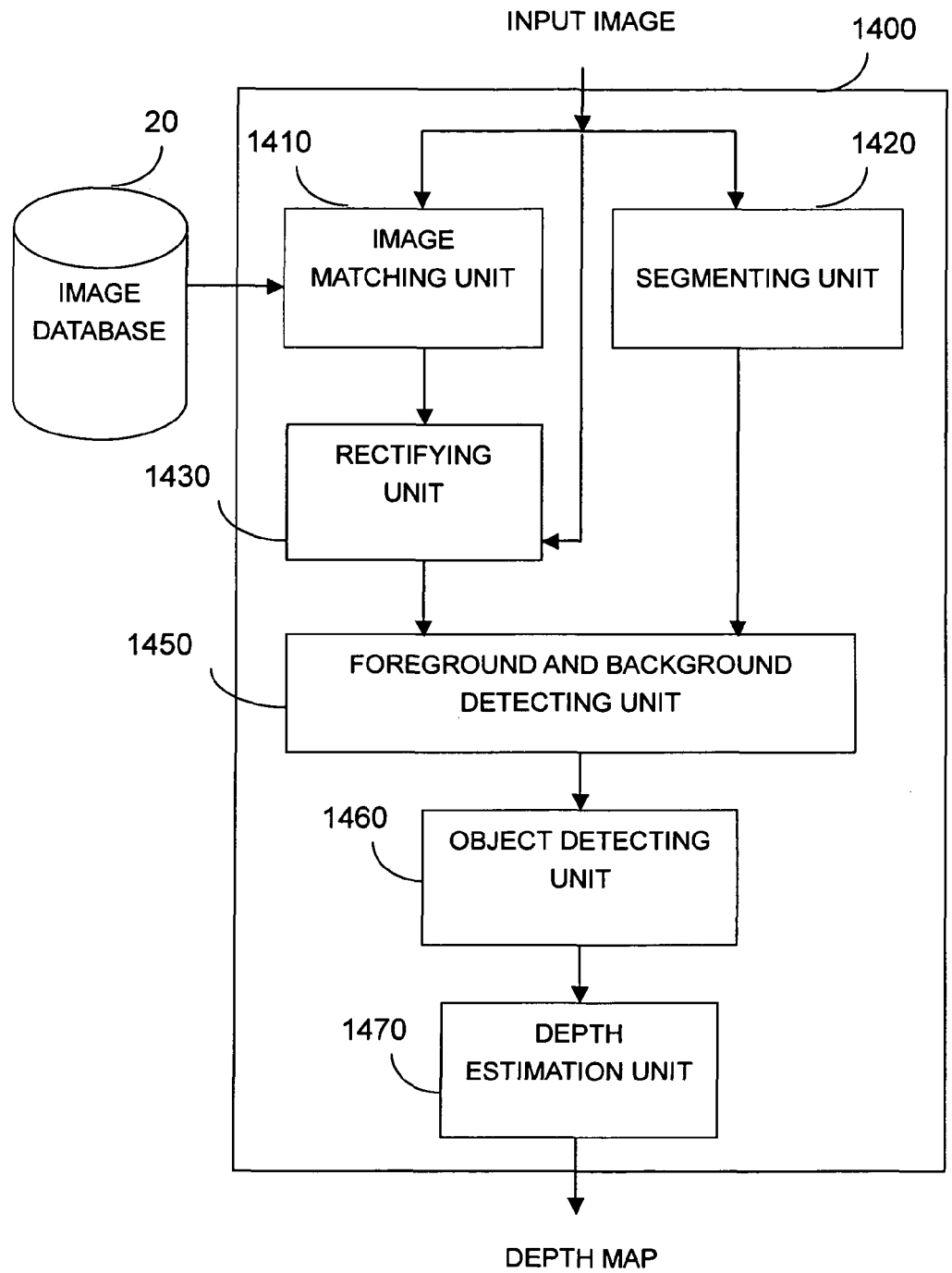
FIG. 14 shows an image conversion system according to a third exemplary embodiment consistent with the invention.

FIG. 14 shows an image conversion system 1400 according to a third exemplary embodiment consistent with the invention. Referring to FIG. 14, the image conversion system 1400 converts a two-dimensional image into three-dimensional image content. The system includes an image matching unit 1410, a rectifying unit 1430, a segmenting unit 1420, a foreground and background detecting unit 1450 and a depth estimating unit 1470.

The image matching unit 1410 determines a matched background image, which most closely approximates content of the input two-dimensional image, according to a digital image database. The rectifying unit 1430 obtains a rectified background image located on the same image-capturing plane of the input two-dimensional image according to the matched background image and the input two-dimensional image. The segmenting unit 1420 performs the segmentation operation on the input two-dimensional image to obtain a segmented image, which includes a plurality of patches. These patches respectively represent pixels correspondingly having similarity in the input two-dimensional image. The foreground and background detecting unit 1450 performs the subtraction operation on the input two-dimensional image and the rectified background image according to the input two-dimensional image, the rectified background image and the segmented image so as to separate the patches of the segmented image into a foreground patch group and a background patch group. The depth estimating unit 1470 sets a depth value corresponding to each of the patches of the background patch group and the foreground patch group to obtain a depth map of the input two-dimensional image according to the depth information provided by the rectified background image. The three-dimensional image content is based on the input two-dimensional image and the depth map.

In addition, the image conversion system 1400 further includes an object detecting unit 1460 for determining whether there is any patch of the foreground patch group satisfying at least one object feature, for performing the boundary smoothing process on each patch satisfying the object feature, and thus to adjust the foreground patch group. The adjusted foreground patch group is processed by the depth estimating unit 1470. In other examples, if the image conversion system needs not to use the object detecting unit 1460, or other processing is needed after the output of the foreground and background detecting unit 1450, then the output result may be transferred to the depth estimating unit 1470 after the associated processing ends.

The image conversion system 1400 may be implemented by a logic circuit or FPGA. In addition, an independent chip or an application specific circuit may be employed to implement the image conversion system 1400.

Figure 15:
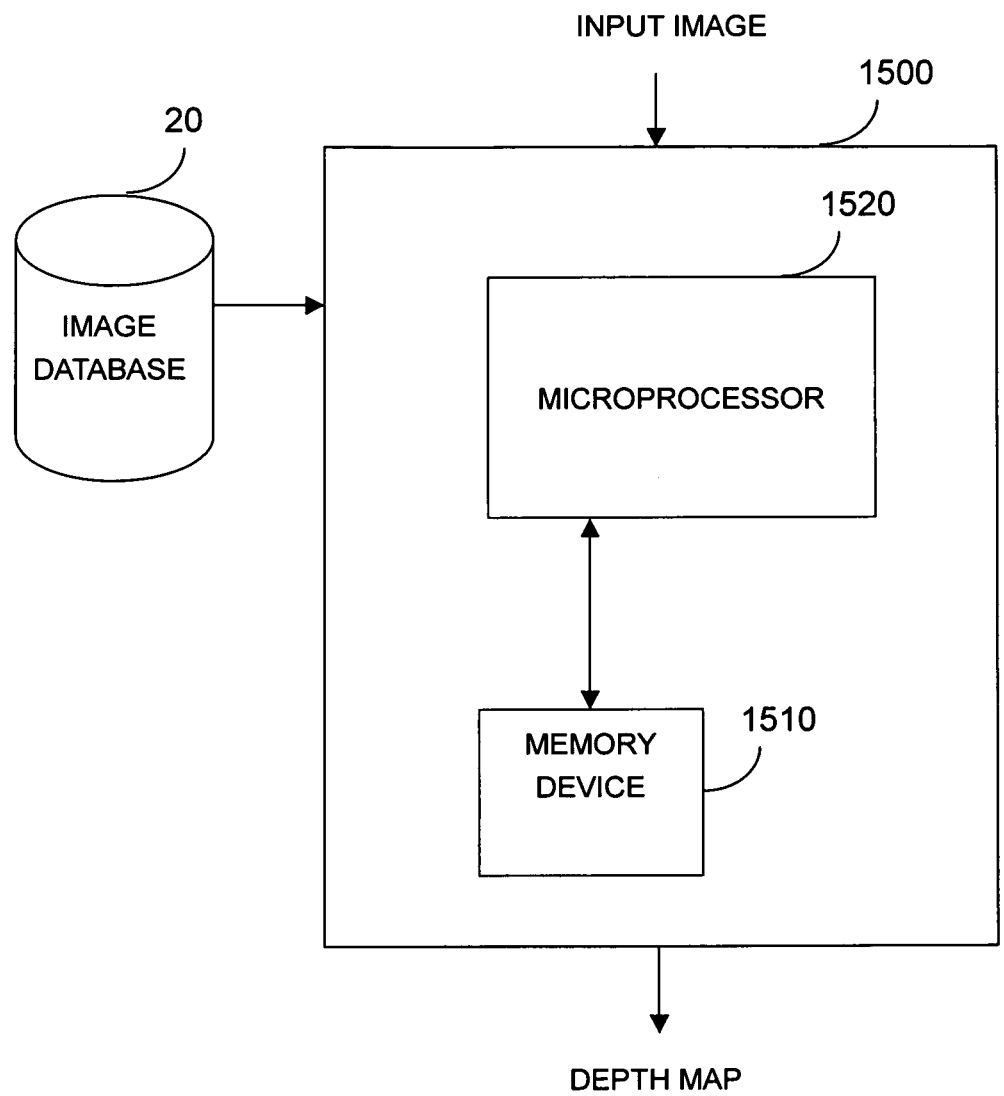
FIG. 15 shows an image conversion system according to a fourth exemplary embodiment consistent with the invention.

FIG. 15 shows an image conversion system 1500 according to a fourth exemplary embodiment consistent with the invention. Referring to FIG. 15, the image conversion system 1500 for converting a two-dimensional image into three-dimensional image content includes a memory device 1510 and a microprocessor 1520.

The memory device 1510 stores executable codes or instructions for implementation consistent with the above-mentioned image conversion method. The microprocessor 1520 reads the instructions stored in the memory device 1510 to perform the following steps. A matched background image, which most closely approximates a content of the two-dimensional image, is determined from the background image of a digital image database. In addition, the microprocessor 1520 further performs the rectification operation to obtain a rectified background image, which is located on the same image-capturing plane as the two-dimensional image according to the matched background image and the two-dimensional image. The microprocessor 1520 performs the segmentation operation on the two-dimensional image to obtain a segmented image, which includes a plurality of patches. These patches respectively represent pixels correspondingly having similarity in the input two-dimensional image. The microprocessor 1520 further performs the subtraction operation on the two-dimensional image and the rectified background image according to the two-dimensional image, the rectified background image and the segmented image, and performs the foreground and background detection operation to separate the patches of the segmented image into a foreground patch group and a background patch group. The microprocessor 1520 performs the depth estimation operation to set a depth value corresponding to each of the patches of the background patch group and the foreground patch group and thus to obtain a depth map of the two-dimensional image according to the depth information provided by the rectified background image. The three-dimensional image content is based on the two-dimensional image and the depth map.

The image conversion system 1500 may be implemented by an embedded system or universal microprocessor (e.g., the microprocessor for a personal computer or a notebook computer). In addition, the image conversion system 1500 shows the basic architecture, and other applications may be based on the architecture and implemented by the typical computer or mobile computing device.

In addition, the memory device 1510 may also be implemented as the microprocessor or computer readable medium, such as an optical disk or a memory, or other storage devices, such as a hard disk drive having the microprocessor or computer executable data, which includes the microprocessor or computer executable codes implemented in the above-mentioned exemplary embodiment to convert the input two-dimensional image into the three-dimensional image content.

Furthermore, the first and second exemplary embodiments and various exemplary embodiments of other steps of the method may also be implemented in the image conversion system 1400 or 1500 to obtain the other examples for implementation consistent with the invention.

The two-dimensional to three-dimensional image conversion methods according to the exemplary embodiments consistent with the invention can achieve the automatic transformation based on the digital image database providing example(s) of depth information (example-based), and are thus different from the prior art, in which the results of conversion can meet the requirement only for a certain type of 2D image content or with the reliance on manual adjustment. Furthermore, the digital image database of the exemplary embodiment may also have the more efficient determination via the artificial intelligence training, for example.

The method according to each exemplary embodiment can facilitate the user in converting the digital photographs shot in the daily life into the 3D content so that the stereoscopic effect can be generated on the stereoscopic display. Based on an image database, the software, hardware device or the advanced hardware chip design that implements the exemplary embodiment consistent with the invention can automatically generate the 3D content (e.g., the 2D-plus-depth format) for an input image photo.

As for other more advanced development, the three-dimensional model database analysis and comparison using a single image can be implemented according to the image-database-based concept of the software. Thus, the advanced rendering associated function can be developed so that the interactive effect can be achieved with one input image. For example, different viewing angles can be switched, the depth of field can be adjusted, and the image can be repaired. For example, other images at other viewing angles near a viewing angle can be generated from the corresponding depth map so that the user can watch the images at different angles. In addition, after the corresponding depth map is obtained, the user can adjust the position of the object at a certain depth from the depth map. For example, the object can be eliminated or moved or a new object may be generated at a specific depth. Thus, the image depth effect of the human visual perception can be achieved.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image conversion method of converting an input two-dimensional image into three-dimensional image content, the method comprising the steps of:
    obtaining from an image database, a matched background image, which most closely approximates content of the input two-dimensional image;
    performing a rectification operation to obtain a rectified background image according to the matched background image and the input two-dimensional image, wherein the rectified background image and the input two-dimensional image have a same image-capturing plane;
    performing a segmentation operation on the input two-dimensional image to obtain a segmented image, which comprises a plurality of patches;
    performing a foreground and background detection operation to separate the patches of the segmented image into a foreground patch group and a background patch group according to the input two-dimensional image, the rectified background image and the segmented image; and
    performing a depth estimation operation to set a depth value corresponding to each of the patches of the background patch group and the foreground patch group and to obtain a depth map of the input two-dimensional image according to depth information provided by the rectified background image,
    wherein the three-dimensional image content is based on the input two-dimensional image and the depth map.

2. The method according to claim 1, further comprising the step of:
    performing an object detection operation on the foreground patch group to determine whether there is any patch of the foreground patch group satisfying at least one object feature, performing a boundary smoothing process on each patch satisfying the at least one object feature, and thus adjusting the foreground patch group into an adjusted foreground patch group for processing in the step of performing the depth estimation operation.

3. The method according to claim 1, wherein the step of performing the foreground and background detection operation comprises:
    performing a subtraction operation according to the input two-dimensional image and the rectified background image; and
    performing a foreground and background classification according to a result of the subtraction operation and the segmented image to classify the patches of the segmented image into the foreground patch group and the background patch group.

4. The method according to claim 1, wherein the segmentation operation is performed before or after the step of performing the rectification operation and the step of obtaining the matched background image.

5. The method according to claim 1, wherein the segmentation operation is performed in parallel with the step of performing the rectification operation and the step of obtaining the matched background image.

6. A non-transitory computer readable medium having computer executable data, which comprises codes of executing each step recited in the image conversion method of claim 1.

7. The medium according to claim 6, wherein the image conversion method further comprises the step of:
    determining whether there is any patch of the foreground patch group satisfying at least one object feature, performing a boundary smoothing process on each patch satisfying the object feature, and thus adjusting the foreground patch group for processing in the depth estimation operation.

8. An image conversion method of converting an input two-dimensional image into three-dimensional image content, the method comprising the steps of:
    selecting one of a plurality of example background images of an image database as a matched background image;
    performing a rectification operation to rectify the matched background image, so that the rectified matched background image and the input two-dimensional image are located on the same reference plane, to obtain a rectified background image according to the matched background image and the input two-dimensional image;
    performing a segmentation operation on the input two-dimensional image to obtain a segmented image, which comprises a plurality of patches;
    performing a foreground and background detection operation to separate the patches of the segmented image into a foreground patch group and a background patch group according to the input two-dimensional image, the rectified background image, and the segmented image; and
    performing a depth estimation operation to set a depth value corresponding to each of the patches of the background patch group and the foreground patch group and to obtain a depth map of the input two-dimensional image according to depth information provided by the rectified background image, wherein the three-dimensional image content is based on the input two-dimensional image and the depth map.

9. The method according to claim 8, wherein the image database comprises the depth information of the example background images.

10. The method according to claim 9, wherein the depth information of one of the example background images comprises a ground-vertical boundary between a ground and a vertical object in the example background image.

11. The method according to claim 9, wherein the depth information of the example background images are given in advance.

12. The method according to claim 8, further comprising a method of generating the depth information of the example background images, wherein the method of generating the depth information comprises the steps of:

performing a vertical object and ground classification on the example background images, the step comprising:
separating the example background image into a plurality of patches and labeling each of the patches of the example background image as a vertical object or a ground object; and for each of the example background images, determining a ground-vertical boundary for all the patches of the example background image according to the patches labeled as the vertical object and the patches labeled as the ground object, wherein the depth information of the example background image comprises the ground-vertical boundary.

13. The method according to claim 12, wherein the step of performing the vertical object and ground classification further comprises:

generating a classifier with the example background images serving as a training dataset by way of supervised learning, wherein an input of the classifier is one of the patches of each of the example background images in the training dataset, and an output of the classifier is one of labeling results of the vertical object or the ground object.

14. The method according to claim 12, wherein the step of determining the ground-vertical boundary comprises:

for each of the example background images, determining at least one boundary between a vertical object and a ground object for all the patches labeled as the vertical object and all the patches labeled as the ground object; and for each of the example background images, determining the ground-vertical boundary for the example background image according to the at least one boundary of the example background image.

15. The method according to claim 8, wherein the depth information provided by the rectified background image comprises a ground-vertical boundary of the rectified background image, and the step of performing the depth estimation operation comprises:

setting the depth value corresponding to each of the patches of the background patch group according to the ground-vertical boundary of the rectified background image; and setting the depth value corresponding to each of the patches of the foreground patch group, wherein the depth map comprises the depth value corresponding to each of the patches of the background patch group and the foreground patch group.

16. The method according to claim 8, wherein the step of performing the foreground and background detection operation comprises:

performing a subtraction operation according to the input two-dimensional image and the rectified background image; and performing a foreground and background classification according to a result of the subtraction operation and the segmented image to classify the patches of the segmented image into the foreground patch group and the background patch group.

17. The method according to claim 16, wherein in the step of performing the foreground and background detection operation, the subtraction operation calculates a pixel-based difference of the input two-dimensional image and the rectified background image, wherein the result of the subtraction operation represents difference values between corresponding pixel data of the input two-dimensional image and the rectified background image.

18. The method according to claim 17, wherein in the step of performing the foreground and background detection operation, a pixel position is classified as the background if the result of the subtraction operation at the pixel position is smaller than a threshold value, or otherwise the pixel position is classified as the foreground.

19. The method according to claim 18, wherein in the step of performing the foreground and background detection operation and when the foreground and background classification is being performed, one of the patches of the segmented image is classified as the foreground if a ratio of the number of pixels in the patch, classified as the foreground according to the subtraction operation, to the total number of pixels in the patch is greater than a ratio threshold value.

20. The method according to claim 16, wherein in the step of performing the foreground and background detection operation, the subtraction operation is a patch-based correlation subtraction operation according to a correlation window of one of the input two-dimensional image and the rectified background image, and a patch in a search window of the other one of the input two-dimensional image and the rectified background image, wherein the search window is greater than the correlation window, wherein results obtained after the correlation subtraction operation is performed on all the patches of one of the input two-dimensional image and the rectified background image represent differences between the input two-dimensional image and the rectified background image.

21. The method according to claim 20, wherein in the step of performing the foreground and background detection operation, the correlation window is classified as the foreground if the results of the correlation subtraction operation is smaller than a threshold value.

22. The method according to claim 16, wherein the step of performing the foreground and background classification comprises:

setting a ratio of the number of pixels classified as the foreground to the number of pixels classified as the background for each of the patches of the segmented image according to the result of the subtraction operation and the segmented image to obtain foreground information and thus to classify each of the patches of the segmented image into the foreground or the background.

23. The method according to claim 16, wherein in the step of performing the foreground and background detection operation, the subtraction operation is based on pixel or patch selectively.

24. The method according to claim 23, wherein in the step of performing the foreground and background detection operation, the result of the subtraction operation is compared with a threshold value to classify each of the patches of the segmented image into the foreground or the background.

25. The method according to claim 16, wherein the step of performing the foreground and background classification comprises:
merging the patches of the segmented image, classified as the foreground, into a patch belonging to the foreground patch group.

26. The method according to claim 16, wherein in the step of performing the foreground and background detection operation further comprises, before the step of performing the subtraction operation:
performing a color calibration on the input two-dimensional image and the rectified background image,
wherein the subtraction operation is performed according to the input two-dimensional image and the rectified background image, which have been color corrected.

27. The method according to claim 8, wherein one of the example background images of the image database is selected as the matched background image according to a texton histogram similarity and the number of corresponding feature point pairs, wherein the matched background image has a higher similarity and a greatest number of corresponding feature point pairs than those among the other example background images.

28. The method according to claim 8, wherein, the step of performing the rectification operation comprises:
comparing the matched background image with the input two-dimensional image to find a plurality of corresponding feature points; and
rectifying the matched background image, such that the rectified matched background image and the input two-dimensional image are located on the same reference plane, to obtain the rectified background image according to the corresponding feature points.

29. The method according to claim 8, wherein the example background images of the image database comprise an image shot by a user.

30. The method according to claim 8, wherein the depth information of the background images is obtained by a depth information estimation when the depth estimation operation is to be performed.

31. The method according to claim 30, wherein the depth information estimation of the rectified background image is obtained based on a vanishing point, an object size, or an object shielding relationship.

32. An image conversion method of converting an input two-dimensional image into three-dimensional image content, the method comprising the steps of:
selecting one of a plurality of example background images of an image database as a matched background image, wherein content of the matched background image, among the other the example background images, most closely approximates content of the input two-dimensional image;
performing a rectification operation to rectify the matched background image, such that the rectified matched background image and the input two-dimensional image are located on the same reference plane, to obtain a rectified background image according to the matched background image and the input two-dimensional image;
performing a segmentation operation on the input two-dimensional image to obtain a segmented image, which comprises a plurality of patches, wherein each of the patches respectively represents correspondingly homogeneous pixels included in the input two-dimensional image;
performing a foreground and background detection operation according to the input two-dimensional image, the rectified background image and the segmented image, wherein the step of performing the foreground and background detection operation comprises:
performing a subtraction operation on the input two-dimensional image and the rectified background image; and
performing a foreground and background classification according to a result of the subtraction operation and the segmented image in order to classify the patches of the segmented image as a foreground or a background, and separating the patches of the segmented image into a foreground patch group and a background patch group;
performing an object detection operation on the foreground patch group to determine whether there is any patch of the foreground patch group satisfying at least one object feature, and performing a boundary smoothing process on each patch satisfying the at least one object feature to obtain an adjusted foreground patch group, which is based on the patches which are processed by the boundary smoothing process; and
performing a depth estimation operation according to depth information provided by the rectified background image in order to assign a depth value corresponding to each of the patches of the background patch group and the adjusted foreground patch group and to obtain a depth map of the input two-dimensional image accordingly,
wherein the three-dimensional image content is based on the input two-dimensional image and the depth map.

33. The method according to claim 32, wherein the step of performing the object detection operation comprises:
performing a dedicated object detection operation to determine whether there is any patch of the foreground patch group satisfying a dedicated object feature, and performing the boundary smoothing process on a boundary of each patch satisfying the dedicated object feature.

34. The method according to claim 32, wherein the step of performing the object detection operation comprises:
performing a human feature detection operation to determine whether there is any patch of the foreground patch group satisfying a human feature, and performing the boundary smoothing process on a boundary of each patch satisfying the human feature.

35. The method according to claim 34, wherein in the step of performing the object detection operation, the human feature detection comprises a human body detection, and the human feature is a human-like contour.

36. The method according to claim 34, wherein in the step of performing the object detection operation, the human feature detection comprises a human face detection operation, and the human feature is a human face feature.

37. The method according to claim 34, wherein in the step of performing the object detection operation, the boundary smoothing process re-corrects a shape of the patch satisfying the human feature, based on principle component analysis (PCA).

38. The method according to claim 34, wherein in the step of performing the object detection operation, the boundary smoothing process comprises:
training a principle component analysis model to obtain prior information according to known contour data of the human feature in order to depict a contour of the human feature by the principle component analysis model, wherein the contour of the human feature is regarded as a lower-order principle component, and a zigzag contour is regarded as a high-order component.

39. The method according to claim 38, wherein in the step of performing the object detection operation, the boundary smoothing process comprises:

performing an edge detection operation on each patch satisfying the human feature, finding a control point according to the prior information, and performing a control point position adjustment according to the trained principle component analysis model to obtain a smoothed result.

40. An image conversion system for converting an input two-dimensional image into three-dimensional image content, the system comprising:

an image matching unit for determining a matched background image according to an image database, wherein the matched background image most closely approximates the input two-dimensional image in content,;

a rectifying unit for obtaining a rectified background image, which is on a same image-capturing plane as that of the input two-dimensional image, according to the matched background image and the input two-dimensional image;

a segmenting unit for performing a segmentation operation on the input two-dimensional image to obtain a segmented image, which comprises a plurality of patches;

a foreground and background detecting unit for separating the patches of the segmented image into a foreground patch group and a background patch group by performing a subtraction operation on the input two-dimensional image and the rectified background image according to the input two-dimensional image, the rectified background image and the segmented image; and a depth estimating unit for setting a depth value corresponding to each of the patches of the background patch group and the foreground patch group to obtain a depth map of the input two-dimensional image according to depth information provided by the rectified background image, wherein the three-dimensional image content is based on the input two-dimensional image and the depth map.

41. The system according to claim 40, further comprising:

an object detecting unit for determining whether there is any patch of the foreground patch group satisfying at least one object feature, and performing a boundary smoothing process on each patch satisfying the object feature, and thus adjusting the foreground patch group to obtain an adjusted foreground patch group to be processed by the depth estimating unit.

42. The system according to claim 40, wherein the image conversion system is a field programmable gate array.

43. An image conversion system for converting a two-dimensional image into three-dimensional image content, the system comprising:

a memory device; and a microprocessor, coupled to the memory device, for reading commands stored in the memory device to:

determine a matched background image, which most closely approximates content of the two-dimensional image, according to a digital image database;

perform a rectification operation according to the matched background image and the two-dimensional image to obtain a rectified background image, wherein the rectified background image and the two-dimensional image are on a same image-capturing plane;

perform a segmentation operation on the two-dimensional image to obtain a segmented image, wherein the segmented image comprises a plurality of patches, and each of the patches respectively represents a portion of pixels in the two-dimensional image correspondingly having similarity;

perform a subtraction operation on the two-dimensional image and the rectified background image according to the two-dimensional image, the rectified background image and the segmented image, and to perform a foreground and background detection operation to separate the patches of the segmented image into a foreground patch group and a background patch group; and perform a depth estimation operation to set a depth value corresponding to each of the patches of the background patch group and the foreground patch group to obtain a depth map of the two-dimensional image according to depth information provided by the rectified background image, wherein the three-dimensional image content is based on the two-dimensional image and the depth map.

44. The system according to claim 43, wherein the microprocessor is further for:

determining whether there is any patch of the foreground patch group satisfying at least one object feature, performing a boundary smoothing process on each patch satisfying the object feature, and thus adjusting the foreground patch group for processing of the depth estimation operation.

45. The system according to claim 43 being an embedded system.

46. The system according to claim 43 being a microprocessor.

* * * * *